United States Patent
Beattie, Jr. et al.

(10) Patent No.: US 10,834,725 B2
(45) Date of Patent: Nov. 10, 2020

(54) RADIO RESOURCE POOLING ASSOCIATED WITH COMMUNICATION DEVICES

(71) Applicants: AT&T INTELLECTUAL PROPERTY I, L.P., Atlanta, GA (US); AT&T Mobility II LLC, Atlanta, GA (US)

(72) Inventors: James Gordon Beattie, Jr., Bergenfield, NJ (US); Haywood Peitzer, Randolph, NJ (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 386 days.

(21) Appl. No.: 15/220,382

(22) Filed: Jul. 26, 2016

(65) Prior Publication Data
US 2018/0035419 A1    Feb. 1, 2018

(51) Int. Cl.
*H04W 72/04* (2009.01)
*H04W 72/08* (2009.01)
(Continued)

(52) U.S. Cl.
CPC ..... *H04W 72/048* (2013.01); *H04W 52/0216* (2013.01); *H04W 72/085* (2013.01);
(Continued)

(58) Field of Classification Search
CPC ........................ H04W 72/085; H04W 72/121; H04W 72/048
(Continued)

(56) References Cited

U.S. PATENT DOCUMENTS 5,301,333 A   4/1994 Lee
5,623,672 A   4/1997 Popat
(Continued)

FOREIGN PATENT DOCUMENTS

CA   2624606 A1   5/2007
EP   2056616 A1   5/2009
(Continued)

OTHER PUBLICATIONS

Campista, et al. "Routing metrics and protocols for wireless mesh networks." IEEE Network—Jan./Feb. 2008, 7 pages.
(Continued)

*Primary Examiner* — Mark H Rinehart
*Assistant Examiner* — Kokou R Detse
(74) *Attorney, Agent, or Firm* — Amin, Turocy & Watson, LLP

(57) ABSTRACT

User equipments (UEs) can be efficiently clustered into groups of UEs where a UE of a group can be selected as a host UE to communicate with a radio access network (RAN) on behalf of other UEs in the group. A resource manager component can receive information, including predictive information of predicted future UE performance or characteristics, relating to respective power availability, signal strength, data performance, and transit vectors of respective UEs from UEs in an area, and determine which UEs are to be clustered in a group and which UE(s) of the group is to be a host UE(s) for the group based on such information. The host UE can facilitate communications between the other UEs in the group and the RAN. The resource manager component also can employ a round-robin technique for substantially equal sharing of duties as host UE among multiple UEs of the group.

20 Claims, 13 Drawing Sheets

(51) Int. Cl.
*H04W 52/02* (2009.01)
*H04W 88/04* (2009.01)

(52) U.S. Cl.
CPC ........ *H04W 52/0229* (2013.01); *H04W 88/04* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/22* (2018.01)

(58) Field of Classification Search
USPC ........................................................ 370/336
See application file for complete search history.

(56) References Cited

U.S. PATENT DOCUMENTS

| | | | |
|---|---|---|---|
| 5,729,702 | A | 3/1998 | Creedon et al. |
| 5,832,278 | A | 11/1998 | Pham |
| 6,665,760 | B1 | 12/2003 | Dotson |
| 7,020,878 | B1 | 3/2006 | Rhee et al. |
| 7,143,219 | B1 | 11/2006 | Chaudhari et al. |
| 7,177,275 | B2 | 2/2007 | Stanwood et al. |
| 7,360,219 | B2 | 4/2008 | Rhine |
| 7,379,447 | B2 | 5/2008 | Dunagan et al. |
| 7,664,897 | B2 | 2/2010 | Cohen et al. |
| 7,852,796 | B2 | 12/2010 | Wang et al. |
| 8,254,368 | B2 | 8/2012 | Huber et al. |
| 8,286,173 | B2 | 10/2012 | Proctor et al. |
| 8,351,379 | B2 | 1/2013 | Hui et al. |
| 8,463,280 | B1* | 6/2013 | Lim ................. H04W 28/26 455/452.1 |
| 8,565,164 | B2 | 10/2013 | Backes |
| 8,625,498 | B2 | 1/2014 | Bourlas et al. |
| 8,862,178 | B2 | 10/2014 | Krishnaswamy et al. |
| 9,170,843 | B2 | 10/2015 | Glew et al. |
| 2004/0147223 | A1 | 7/2004 | Cho |
| 2011/0086661 | A1* | 4/2011 | Yamamoto ........... H04L 1/1893 455/513 |
| 2013/0223362 | A1* | 8/2013 | Alfano ................. H04W 72/04 370/329 |
| 2013/0260772 | A1* | 10/2013 | Kim ..................... H04W 28/16 455/447 |
| 2016/0029370 | A1* | 1/2016 | Hayes .................. H04W 4/029 455/418 |
| 2016/0094398 | A1 | 3/2016 | Choudhury et al. |
| 2016/0119184 | A1 | 4/2016 | Soriaga et al. |
| 2016/0119931 | A1 | 4/2016 | Soriaga et al. |
| 2016/0255052 | A1* | 9/2016 | Barraclough ....... H04L 63/0281 726/12 |

FOREIGN PATENT DOCUMENTS

| | | | | |
|---|---|---|---|---|
| EP | 2366261 | A1 | 9/2011 | |
| EP | 2865231 | A1 | 4/2015 | |
| EP | 2869659 | A1 * | 5/2015 | ............. H04W 4/90 |
| EP | 2869659 | A1 | 5/2015 | |

OTHER PUBLICATIONS

Riggio, et al. "Mesh your senses: Multimedia applications over wifibased wireless mesh networks." 6th Annual IEEE Communications Society Conference on Sensor, Mesh and Ad Hoc Communications and Networks Workshops, 2009. SECON Workshops' 09. 3 pages.

Adya, et al. "A multiradio unification protocol for IEEE 802.11 wireless networks." Proceedings. First International Conference on Broadband Networks, 2004. BroadNets 2004. (Jul. 2003 Technical Report). 4 pages.

Salem, et al. "An overview of radio resource management in relayenhanced OFDMA-based networks." IEEE Communications Surveys & Tutorials, vol. 12, No. 3, Third Quarter 2010, 17 pages.

Kyasanur, et al. "Net-X: System eXtensions for supporting multiple channels, multiple interfaces, and other interface capabilities." University of Illinois at Urbana Champaign, Wireless Networking Group, Urbana, IL, Technical Report, Aug. 2006. http://www.hserus.net/~cck/papers/netx.pdf, 20 pages.

* cited by examiner

RADIO RESOURCE POOLING ASSOCIATED WITH COMMUNICATION DEVICES

TECHNICAL FIELD

This disclosure relates generally to network communications, e.g., to radio resource pooling associated with communication devices.

BACKGROUND

Conventionally, individual communication devices compete for time slots and bandwidth in a packet scheduler of a sector of a communication network. The higher the number of communication devices attempting to communicate in a sector, the higher the contention, or at least the higher the potential for higher contention, between communication devices competing for time slots and bandwidth in the packet scheduler of the sector of the communication network. This can result in a less desirable user experience for users who are attempting use their communication devices to communicate (e.g., voice calls, data communications, messaging) in the communication network.

The above-described description is merely intended to provide a contextual overview of wireless communication networks, and is not intended to be exhaustive.

DETAILED DESCRIPTION

Figure 1:
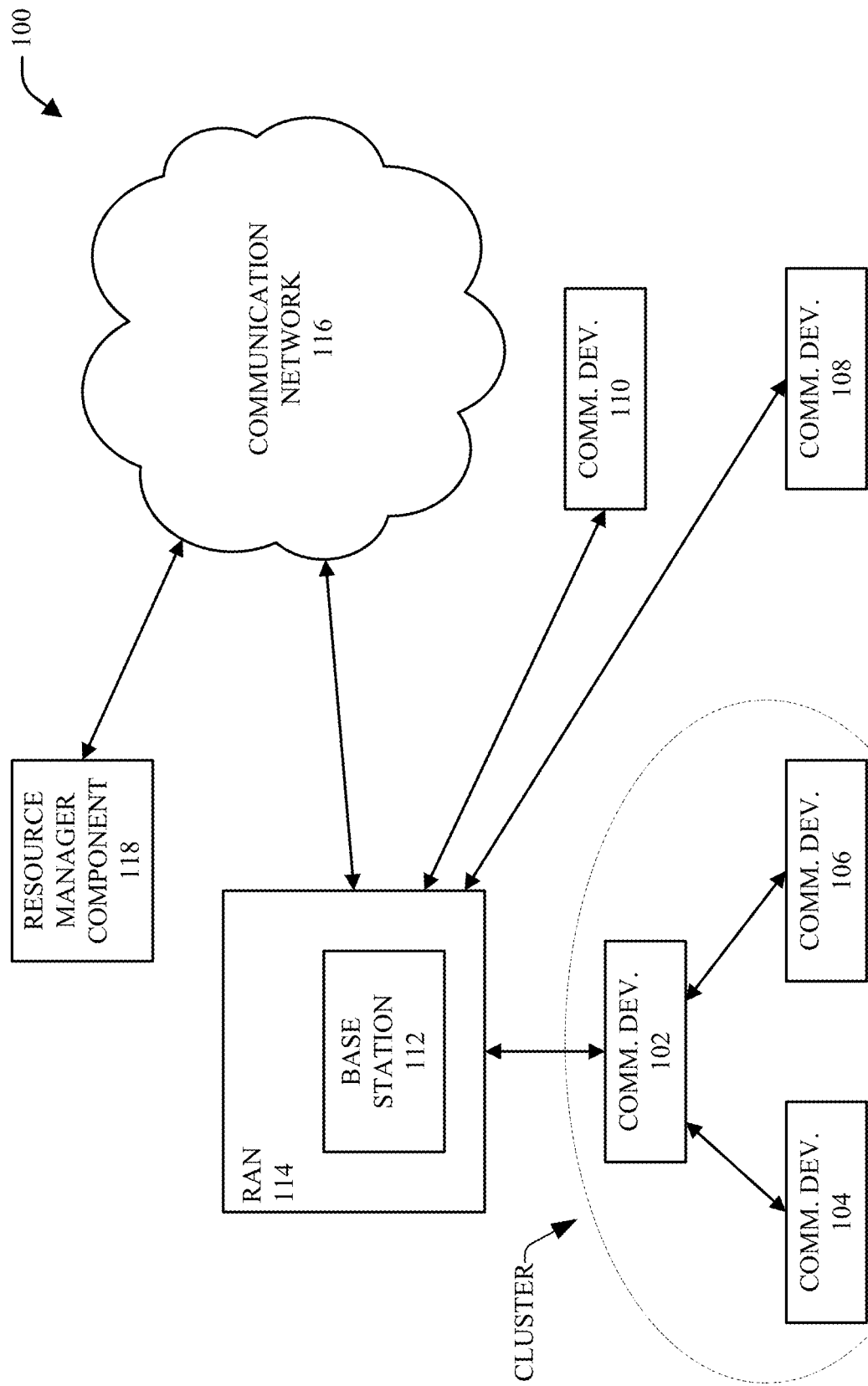
FIG. 1 illustrates a block diagram of an example system that can facilitate clustering respective subsets of communication devices into respective clusters and selecting a host communication device(s) that can act on behalf of the communication devices of a cluster of communication devices with regard to communications between the communication devices of the cluster and a radio access network(s) (RAN(s)) associated with a communication network, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Conventionally, individual communication devices compete for time slots and bandwidth in a packet scheduler of a sector of a communication network. The higher the number of communication devices attempting to communicate in a sector, the higher the contention, or at least the higher the potential for higher contention, between communication devices competing for time slots and bandwidth in the packet scheduler of the sector of the communication network. This can result in a less desirable user experience for users who are attempting use their communication devices to communicate (e.g., voice calls, data communications, messaging) in the communication network.

A basic local tethering arrangement for neighboring communication devices can be created, and access to a radio access network (RAN) associated with the sector can be aggregated with the first communication device of the basic local tethering arrangement selected, or a communication device randomly selected, to communicate with the RAN on behalf of the other communication devices of the basic local tethering arrangement. However, in such basic local tethering arrangement, a case can be foreseen where the battery life of the selected communication device can be insufficient or can be negatively impacted as a result of being used to communicate with the RAN on behalf of the other communication devices of the basic local tethering arrangement, due in part to the extra battery power used to communicate information between the RAN and the other communication devices. Also, the respective performance and characteristics of communication devices can vary over time. As a result, a communication device, which may be suitable at one time to be used to communicate with the RAN on behalf of the other communication devices of the basic local tethering arrangement, may not be suitable at another time to be used to communicate with the RAN on behalf of the other communication devices of the basic local tethering arrangement.

To that end, techniques for efficiently clustering communication devices (e.g., user equipment (UEs)) to form groups (e.g., local groups) of communication devices, wherein a communication device of a group of communication devices can be selected as a host (e.g., a primary) communication device to communicate with a radio access network (RAN) of a communication network on behalf of other communication devices in the group of communication devices. A resource manager component can receive information, including information relating to (e.g., that can be used to generate) predictive information of predicted future communication-device performance or characteristics, relating to respective power availability, signal strength, data performance, and/or transit vectors of respective communication devices from the respective communication devices in an area (e.g., a defined area, such as a sector associated with a base station and RAN). The resource manager component can analyze such information and can determine which communication devices are to be clustered together in a group of communication devices and which communication device of the group is to be a host communication device for the group based on the results of analyzing such information. The host communication device can communicate with the other communication devices in the group, and can act on behalf of the other communication devices in the group to facilitate communication information between the other communication devices in the group and the RAN via the host communication device. Also, based at least in part on the results of analyzing such information (e.g., the predictive information), the resource manager component can determine whether a clustered group of communication devices is to be modified, for example, to add and/or remove a communication device(s) from the group or select a different communication device to be a host communication device, and/or determine whether to de-cluster a group of communication devices.

In some implementations, with respect to a clustered group of communication devices, the resource manager component also can employ a round-robin technique for rotating the duties of host communication device among multiple communication devices in the group to facilitate equal sharing, or at least substantially equal sharing, of duties as host communication device among such multiple communication devices of the group. This equal sharing or substantially equal sharing of the duties as host communication device among the multiple communication devices of a group can facilitate desirable radio resource pooling and communications for the group of communication devices without unduly taxing the resources of any one particular communication device acting as a host communication device for the group.

These and other aspects and embodiments of the disclosed subject matter will now be described with respect to the drawings.

Referring now to the drawings, FIG. 1 illustrates a block diagram of an example system 100 that can facilitate clustering respective subsets of communication devices into respective clusters and selecting a host communication device(s) that can act on behalf of the communication devices of a cluster of communication devices with regard to communications between the communication devices of the cluster and a RAN(s) associated with a communication network, in accordance with various aspects and embodiments of the disclosed subject matter. The system 100 can comprise communication devices (e.g., mobile and/or wireless communication devices, such as a mobile phone, electronic notebook, electronic pad or tablet, electronic gaming device, personal digital assistant (PDA), computer, set-top box, a communication device integrated with a vehicle), including communication device (comm dev.) 102, communication device 104, communication device 106, communication device 108, and communication device 110, wherein the communication devices 102, 104, 106, 108, and 110 can operate and communicate in a communication network environment. At various times, the communication devices (e.g., communication devices 102, 104, 106, 108, and 110) can be communicatively connected, at various times, via a wireless communication connection(s) to one or more RANs, such as RAN 114, which can comprise one or more base stations, such as, for example, base station 112, to communicatively connect the communication devices to a communication network(s) 116 to enable the communication devices to communicate with other communication devices associated with (e.g., communicatively connected to) the communication network(s) 116 in the communication network environment. The RANs (e.g., 114) can comprise, for example, a 3GPP universal mobile telecommunication system (UMTS) terrestrial RAN (UTRAN), an E-UTRAN (e.g., Long Term Evolution (LTE) RAN), a GSM RAN (GRAN), and/or other type of RAN(s) employing another type of communication technology.

The communication network 116 can comprise one or more wireline communication networks and one or more wireless communication networks, wherein the one or more wireless communication networks can be based at least in part on one or more various types of communication technology or protocols, such as, for example, 3G, 4G, 5G, or x generation (xG) network, where x can be virtually any desired integer or real value; Wi-Fi; etc. The communication network 116 (e.g., a core network, or a network comprising a core network and/or an IP-based network) can facilitate routing voice and data communications between a communication device(s) (e.g., communication device(s) 102, 104, 106, 108, and/or 110) and other communication devices (e.g., remote communication device(s)) associated with the communication network 116 in the communication network environment. The communication network 116 also can allocate resources to the communication devices (e.g., communication devices 102, 104, 106, 108, and/or 110) or other communication devices in the communication network 116, convert or enforce protocols, establish and enforce quality of service (QOS) for the communication devices, provide applications or services in the communication network 116, translate signals, and/or perform other desired functions to facilitate system interoperability and communication in the communication network 116 (e.g., wireless portion of the communication network 116 or wireline portion of the communication network 116). The communication network 116 further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices (e.g., communication devices 102, 104, 106, 108, and/or 110) in the communication network environment.

As the communication device (e.g., communication device 102, 104, 106, 108, or 110) is moved through a wireless communication network environment, at various times, the communication device (e.g., communication device 102, 104, 106, 108, or 110) can be connected (e.g., wirelessly connected) to one of a plurality of access points (APs) (e.g., macro or cellular AP, femto AP, pico AP, wi-fi AP, wi-max AP, hotspot (e.g., hotspot 1.x, hotspot 2.x, where x is an integer number; communication device (e.g., UE functioning as a mobile hotspot)), such as base station 112, that can operate in the wireless communication network environment. An AP (e.g., base station 112) can serve a specified coverage area to facilitate communication by the communication device (e.g., communication device 102, 104, 106, 108, or 110) or other communication devices in the wireless communication network environment. An AP (e.g., base station 112) can serve a respective coverage cell (e.g., macrocell, femtocell, picocell, etc.) that can cover a respective specified area, and the AP can service mobile wireless devices, such as the communication device (e.g., communication device 102, 104, 106, 108, or 110), located in the respective area covered by the respective cell, where such coverage can be achieved via a wireless link (e.g., uplink (UL), downlink (DL)). When an attachment attempt is successful, the communication device (e.g., communication device 102, 104, 106, 108, or 110) can be served by the AP (e.g., base station 112) and incoming voice and data traffic can be paged and routed to the communication device (e.g., communication device 102, 104, 106, 108, or 110) through the AP, and outgoing voice and data traffic from the communication device (e.g., communication device 102, 104, 106, 108, or 110) can be paged and routed through the AP to other communication devices (e.g., another UE) in the communication network environment. In an aspect, the communication device (e.g., communication device 102, 104, 106, 108, or 110) can be connected and can communicate wirelessly using virtually any desired wireless technology, including, for example, cellular, Wi-Fi, Wi-Max, wireless local area networks (WLAN), etc.

The system 100 also can comprise a resource manager component 118 that can be associated with (e.g., communicatively connected to) (as depicted) or part of the communication network 116. The resource manager component 118 can employ techniques, methods, and algorithms that can facilitate efficiently clustering communication devices (e.g., communication device 102, 104, 106, 108, or 110) to form groups (e.g., local groups) of communication devices, wherein a communication device (e.g., communication device 102) of a group of communication devices (e.g., communication devices 102, 104, and 106) can be selected as a host (e.g., a primary) communication device to communicate with the RAN 114 of the communication network 116 on behalf of other communication devices (e.g., communication devices 104 and 106) in the group of communication devices. In some implementations, all or a portion of the resource manager component 118 can reside in a cloud environment. In certain implementations, all or a portion (e.g., agent component) of the resource manager component 118 can reside in one or more of the communication devices (e.g., communication device 102, 104, 106, 108, or 110), a base station(s) (e.g., 112), a RAN(s) (e.g., 114), or the communication network 116. The information that can be communicated via the host communication device (e.g., 102) between the other communication devices (e.g., 104 and 106) of a group (e.g., cluster) of communication devices and the RAN 114 can include voice calls, data communications (e.g., video or audio streaming, textual content, visual images), messages (e.g., short message service (SMS), multimedia messaging service (MMS)), acknowledgement messages, pinging signals, metadata, or other types of information.

The clustering of respective subsets of communication devices into respective groups of communication devices and the selection of respective host communication devices for the respective groups (e.g., as performed or facilitated by the resource manager component 118) can be employed to facilitate crowd sourcing the energy resources of communication devices to attain robust and efficient communication of information between communication devices (e.g., 102, 104, and 106) and the RAN 114, for example, from the standpoint of signal quality and power availability associated with the communication devices. The clustering of communication devices (e.g., 102, 104, and 106) can be a mesh network arrangement, a virtual local area network (VLAN), or other type of network arrangement. The host communication device (e.g., 102) and other communication devices (e.g., 104 and 106) of the group can be communicatively interconnected with each other, wherein there can be peer-to-peer communications between the communication devices of the group.

In some implementations, the host communication device (e.g., 102) can act as a hotspot (e.g., hotspot AP), a guest AP router, an ME, or another network element with respect to (e.g., as viewed by) the other communication devices (e.g., 104, 106) of the group. For example, the host communication device (e.g., 102) can be using 5G wireless millimeter wave technology to communicate with peers (e.g., communication devices 104 and 106) in the group either in the licensed or unlicensed spectrum. The host communication device (e.g., 102) can use a desired technology (e.g., Bluetooth, Wi-Fi, ZigBee) in its own spectrum (e.g., own unlicensed spectrum) to facilitate communications with the other peers in the group (e.g., communication devices 104 and 106), and/or can operate like an ME and look like a network tower to the other peers in the group, operating on different communication bands than the communication bands the host communication device (e.g., 102) uses to communicate with the communication network 116.

By efficiently and desirably (e.g., suitably, acceptably, optimally) clustering communication devices into groups and using host communication devices of the groups to facilitate communications on behalf of the other communication devices of the groups, the system 100, and other disclosed techniques and methods, can facilitate reducing the number of communication devices requesting connections to the base station 112, RAN 114, or communication network 116, reducing the number of communication devices seeking or requesting resource allocations from the base station 112, RAN 114, or communication network 116, and/or reducing contention between communication devices attempting to access the base station 112, RAN 114, or communication network 116.

Also, by efficiently and desirably (e.g., suitably, acceptably, optimally) clustering communication devices into groups and using host communication devices of the groups to facilitate communications on behalf of the other communication devices of the groups, the system 100, and other disclosed techniques and methods, can allow for the creation of efficient communities (e.g., groups, clusters) of communication devices (e.g., customer communication devices) to access the communication network 116 with a desirable (e.g., most favorable or highest potential) level of performance, sustainability of battery power of communication devices, and a more streamlined user experience, as compared to conventional techniques. The system 100, and other disclosed techniques and methods, can further arrange for peer-to-peer connectivity of various communication devices as an off-net extension of the RAN 114 where the corresponding communication devices (e.g., 102, 104, 106, . . . ) can be co-located while also integrating through cloud-based predictive engines of the resource manager component 118, as more fully disclosed herein, wherein the direct peering or crowd-sourced clustering of communication devices into groups of communication devices can desirably be reconfigured.

To facilitate clustering of communication devices into groups and determining host communication devices for the groups, the resource manager component 118 can receive information relating to respective power availability, signal strength, and data performance of respective communication devices (e.g., communication device 102, 104, 106, 108, or 110) from the respective communication devices in an area (e.g., a defined area, such as a sector associated with a base station 112 and RAN 114). Such information can be received by the resource manager component 118, for example, when the respective communication devices register with the base station 112 or RAN 114. The information also can include information relating to (e.g., that can be used to generate) predicted future communication-device performance or characteristics, such as predicted future power availability, signal strength, data performance (e.g., data communication speed, bandwidth), and/or transit vectors of respective communication devices (e.g., communication device 102, 104, 106, 108, or 110). At least a portion of the communication devices (e.g., communication device 102, 104, 106, 108, or 110) can be close enough in proximity to each other to be able to, or otherwise can be able to, interconnect and communicate with each other via one or more desired communication technologies, such as, for example, Wi-Fi, near field communication (NFC), Bluetooth, ZigBee, hardwire connection, and/or other local communications technology to convey their respective information relating to their individual levels and/or predictive levels of resource power availability, signal strength, data performance, speed, reliability, and/or carrier aggregation, etc., to each other and/or to the resource manager component 118 as the communication devices (e.g., communication device 102, 104, 106, 108, or 110) progress through time, space, and connection types.

The information relating to power availability can indicate how much power (e.g., battery power, such as 100% battery power, 90% battery power, . . . ; or 15 hours of power remaining, 12 hours of power remaining, 3 hours of power remaining, 1 hour of power remaining, . . . ) that a communication device currently has or can be predicted to have in the future (e.g., within a defined period of time after the current time) and/or the type of power source (e.g., battery power, AC power) that the communication device is using or is predicted to be using in the future. For example, the respective power availability information associated with the respective communication devices can indicate that one communication device (e.g., 102) has more power available than other communication devices being evaluated by the resource manager component 118. As another example, the respective power availability information associated with the respective communication devices can comprise historical power availability information or e-calendar information associated with the respective communication devices. The historical power availability information can show patterns of device usage by the user, patterns of charging of the battery of the communication devices or using the communication devices while plugged into AC power. For example, the historical power availability information associated with a communication device (e.g., 102) can indicate that the communication device is often plugged into AC power for charging and/or use at a particular time of day during weekdays and at a different time of day on weekends. The e-calendar information of a communication device (e.g., 102) can indicate that the user of the communication device has an appointment (e.g., doctor's appointment) or meeting at a particular time and date, for example, which can indicate that the communication device will not be plugged into AC power during the time of the appointment or meeting (e.g., which also be predicted or inferred in conjunction with historical power availability information). The resource manager component 118 can determine respective current or predicted future power availability of the communication devices based at least in part on such power availability information associated with the respective communication devices, as more fully disclosed herein.

Information relating to data performance associated with the communication devices can comprise current or historical information, or other information (e.g., e-calendar information) that can relate to data performance associated with the communication devices. The data performance information for a communication device can indicate the data communication speed of the communication device, the available bandwidth of the communication device for communicating information, and/or a predicted future data communication speed or predicted future available bandwidth of the communication device. The historical data performance information can indicate data performance patterns associated with a communication device (e.g., the communication device frequently has higher data performance during this (these) particular time(s) on this (these) particular day(s) of the week compared to other times and days of the week).

The information relating to signal strength associated with the communication devices can comprise current or historical information, or other information (e.g., e-calendar information) that can relate to signal strengths associated with the communication devices. The signal strength information for a communication device can indicate the current signal strength of the communication device and/or a predicted future signal strength of the communication device. The historical signal strength information can indicate signal strength patterns associated with a communication device (e.g., the communication device frequently has better (e.g., higher) signal strength during this (these) particular time(s) on this (these) particular day(s) of the week compared to other times and days of the week and/or when the communication device is in this (these) location(s)). The resource manager component 118 can determine current or future signal strengths of communication devices based at least in part on such signal strength information, as more fully disclosed herein.

The information relating to transit vectors associated with the communication devices can comprise current or historical information, or other information (e.g., e-calendar information) that can relate to transit vectors associated with the communication devices. The transit vector information for a communication device can indicate the current transit vector of the communication device and/or a predicted future transit vector of the communication device. For instance, a communication device can communicate its current transit vector and/or an anticipated future (e.g., imminent future) transit vector to the resource manager component 118. The historical transit vector information can indicate transit vector patterns associated with a communication device (e.g., the communication device frequently travels a particular route (e.g., from work to home of the user) during a particular time of the day during weekdays, and/or when the communication device is located in this particular location at this particular time of day, the communication device frequently travels a particular route to another location).

The resource manager component 118 can determine current or future transit vectors associated with communication devices based at least in part on such transit vector information, as more fully disclosed herein. For example, the resource manager component 118 can learn, estimate, predict (e.g., using a predictive engine(s)), or determine an anticipated future movement and/or location of a communication device (e.g., 102) from historical travel patterns associated with the communication device, from a calendar item from an e-calendar associated with the communication device or user (e.g., wherein the calendar item can contain a location (or information from which the location can be determined) and a date/time associated with the calendar item), and/or from practical realities associated with the communication device or user. With regard to practical realities associated with the communication device or user, for instance, if the communication device (e.g., 102) and user are traveling in a vehicle on a freeway, the resource manager component 118 can analyze geographical information (e.g., electronic road map) and can determine that there is no freeway exit for a defined number of miles. The resource manager component 118 also can analyze the rate of speed of the vehicle (e.g., via the rate of speed of movement of the communication device) and can determine the amount of time it will take or can be expected to take for the communication device (and vehicle and user) to reach the next freeway exit. The resource manager component 118 can determine or predict that the communication device (e.g., 102) will remain on the freeway at least to the next exit traveling in the direction(s) associated with the freeway road in that portion of the freeway for at least a defined period of time (e.g., at least until the next freeway exit is reached by the vehicle). This transit vector information can be used by the resource manager component 118 to facilitate making determinations regarding whether to include this communication device (e.g., 102) in a cluster, which cluster of communication devices to include this communication device in, and/or whether to select this communication device as a host (e.g., primary) communication device for the cluster.

The resource manager component 118 also can determine or predict (e.g., using a predictive engine(s)) transit vectors (e.g., travel or movement of communication devices and associated users) based at least in part on whether a communication device is in a vehicle (or is integrated with a vehicle, such as with regard to connected vehicles that comprise a communication device(s)), whether the user of the communication device is traveling by foot, bicycle, or other mode of transportation (e.g., mass transit transportation, such as a bus, train, or plane), the time of day of the traveling, the location of the traveling, etc. For instance, the mass travel of users with communication devices (e.g., by vehicle, by foot, by mass transit) can be predictable to the resource manager component 118 during rush hours.

It is to be appreciated and understood that, in some implementations, to facilitate maintaining and protecting the privacy of users of communication devices and their data, users of communication devices can be asked if they want to "opt in" to services, applications, or programs that would allow the resource manager component 118 or another component (e.g., a network component of the communication network 116) to access certain information (e.g., potentially personal or sensitive information) of users from their communication devices or other sources (e.g., associated with their communication devices). For instance, the default option can be that a user "opts out" to such services, applications, or programs that would allow the resource manager component 118 or another component (e.g., a network component of the communication network 116) to access such certain information of users from their communication devices or other sources. If the user decides to "opt in" to all or a portion of such services, applications, or programs, the resource manager component 118 can access all or a portion information relating to, for example, calendar items on an e-calendar associated with a communication device of a user (e.g., for a defined period of time in the past, present, or future), transit vectors (e.g., past or present future transit vectors) associated with the communication device of the user, device usage associated with the communication device (e.g., when or how much the device is used for voice calls, messaging, web browsing, or video streaming), power resources (e.g., past or present power resource information) associated with the communication device, or other data associated with the communication device or user. The resource manager component 118 can obtain such information from the communication device or from another source that can, for instance, mine (e.g., data mine) and store such information.

With further regard to the above types of information, the resource manager component 118 can analyze such information (e.g., power availability information, data performance information, signal strength information, transit vector information, or relevant other information) and can determine which communication devices (e.g., communication devices 102, 104, and 106) are to be clustered together in a group of communication devices and can determine which communication device (e.g., communication device 102) of the group is to be a host communication device for the group based at least in part on the results of analyzing such information, in accordance with defined grouping criteria and related algorithms (e.g., predictive algorithm). The host communication device (e.g., 102) can communicate with the other communication devices (e.g., communication devices 104 and 106) in the group, and can act on behalf of the other communication devices (e.g., communication devices 104 and 106) in the group (and itself) to facilitate communication information between the other communication devices (e.g., communication devices 104 and 106) in the group (and itself) and the RAN 114 via the host communication device (e.g., 102). Also, based at least in part on the results of analyzing such information (e.g., the predictive information), the resource manager component 118 can determine whether a clustered group of communication devices (e.g., communication devices 102, 104, and 106) is to be modified, for example, to add and/or remove a communication device(s) from the group (e.g., add communication device 108 to and/or remove communication device 104 from the group) or select a different communication device to be a host communication device (e.g., select communication device 106 to replace communication device 102 as the host device), and/or determine whether to de-cluster a group of communication devices (e.g., dissolve a cluster of communication devices).

In analyzing and evaluating, for example, respective data performance characteristics associated with the respective communication devices (e.g., 102, 104, 106, 108, 110), the resource manager component 118 can analyze and evaluate, and can take into account, the respective service quality objectives and the respective priority and/or QOS levels of the communications (e.g., voice, data, messaging, video streaming, audio streaming, pinging) individually and in the aggregate for the respective communication devices in connection with determining which communication devices (e.g., 102, 104, 106, . . . ) to cluster together to form the group and which communication device (e.g., 102) is to be selected as the host communication device for the group.

With respect to a group of communication devices, the resource manager component 118 determine, generate, and/or establish packet scheduling for the communication of respective data packets between the respective communication devices (e.g., 102, 104, 106, . . . ) in the group and the RAN 114 based at least in part on the results of the analyzing of the information relating to the respective device characteristics associated with the communication devices. The resource manager component 118 can communicate the packet scheduling information to the RAN 114 and/or the host communication device (e.g., 102) to facilitate implementation of the packet scheduling by the RAN 114 and/or the host communication device (e.g., 102) for the group of communication devices.

In an example scenario, with regard to various communication devices (e.g., 102, 104, 106, 108, 110) in relative proximity to each other, the resource manager component 118 can analyze the respective device characteristics associated with the respective communication devices (e.g., 102, 104, 106, 108, 110) to facilitate determining whether to cluster all or some of them together into a group and determining which communication device to select to be the host communication device. The resource manager component 118 can identify, for instance, that communication device 102 has more available power than the other communication devices (e.g., 104, 106, 108, 110) and has relatively good data performance characteristics (e.g., relatively good amount of bandwidth available, as compared to the other communication devices, although detecting that communication device 104 has the best data performance characteristics, but also detecting that communication device 104 has an undesirably low amount of power available.

The resource manager component 118 also can identify the current or expected (e.g., predicted) usage (e.g., voice call, video streaming, surfing the web, messaging) of the communication devices (e.g., 102, 104, 106, 108, 110). For instance, the resource manager component 118 can identify that communication device 102 is being used to communicate an acknowledgement message to the communication network 116, communication device 104 is being used to send and receive text messages, communication device 106 is being used for video streaming, and communication device 108 is being used for video streaming, and communication device 110 is being used for a voice call. In this example scenario, the resource manager component 118 also can identify that the communication device 102 at least has the available bandwidth and data communication speed to desirably (e.g., suitably, acceptably, optimally) handle the aggregate communications of communication devices 102, 104, and 106, as, for instance, the communication device 102 can handle its own communication of information, the communication of information (e.g., sending and receiving of text messages) associated with communication device 104, and the communication of information (e.g., video streaming) associated with communication device 106.

The resource manager component 118 further can identify the current or anticipated (e.g., predicted) transit vectors of the communication devices (e.g., 102, 104, 106, 108, 110) to facilitate determining where the communication devices are and/or where they can be expected to move to within a defined period of time in the imminent future. Based in part on the transit vectors, the resource manager component 118 can determine that communication devices 108 and 110 are traveling away from communication device 102, while identifying that communication devices 104 and 106 are expected to remain in sufficient proximity (e.g., within a defined distance) of the communication device 102 for a defined period of time in the imminent future and can maintain connectivity with the communication device 102 during that defined period of time.

Based on the results of analyzing the respective device characteristics associated with the respective communication devices (e.g., 102, 104, 106, 108, 110) in this example scenario, the resource manager component 118 can determine that communication devices 102, 104, and 106 are to be clustered together to form a group of communication devices, whereas communication devices 108 and 110 are not to be included in that group of communication devices, in accordance with the defined grouping criteria, for instance, primarily because the communication devices 102, 104, and 106 are expected to remain in relative proximity to each other for the defined period of time in the imminent future, while communication devices 108 and 110 are not expected to remain in relative proximity to communication device 102 (and communication devices 104 and 106) in the imminent future, and another reason for this clustering selection can be that communication device 108 is also being used for video streaming (and, for instance, the video streaming by communication device 106 in conjunction with the video streaming by communication device 108 can be determined to be undesirable or unsupportable with respect to communication device 102 as the host communication device). In some instances, the resource manager component 118 may determine that the communication devices 108 and 110, and/or other communication devices, are to be clustered together to form a different group of communication devices.

The resource manager device 118 also can determine that communication device 102 is to be selected as the host communication device for the group of communication devices (e.g., 102, 104, 106), in accordance with the defined grouping criteria, for instance, primarily due to the communication device 102 having the most power available, as compared to the other communication devices (e.g., 104, 106, . . . ) in the group and also because the communication device 102 has the data performance characteristics (e.g., data bandwidth, data communication speed) to be able to handle the aggregate communications of the communication devices (e.g., 102, 104, 106, . . . ) of the group. The resource manager component 118 can generate instructions that can be sent to the host communication device 102 (and/or the other communication devices 104, 106) to facilitate clustering the communication devices (e.g., 102, 104, 106, ...) together and instituting communication device 102 as the host communication device for that group of communication devices.

In an alternate example scenario (working from the example scenario), instead of the communication device 102 being determined to have the most power available as compared to the other communication devices (e.g., 104, 106, 108, 110, ... ), based in part on the respective power availability information for the communication devices, the resource manager component 118 determines that the communication device 106 has the most power available (e.g., 10 hours of battery life) out of all of these communication devices and communication device 102 has a relatively fair amount of power available (e.g., 4 hours of battery life). Also, based in part on the respective data performance information for the communication devices, the resource manager component 118 determines that communication device has a lower data performance than communication device 102.

The resource manager component 118 also analyzes the transit vectors associated with the communication device 102 and historical information relating to the charging habits for plugging the communication device 102 into AC power. Based in part on such analysis, the resource manager component 118 determines that, given the current location of the communication device 102 (e.g., traveling in a car with the user), the expected travel path of the car, and the time of day and day of the week, it is likely (e.g., it is predicted) that the communication device 102 will be plugged into an AC power source within 15 minutes, and will have abundant power to handle aggregate communications of the group of communication devices as a host communication device. As a result, even though communication device 102 currently does not have the most power available out of the communication devices, the resource manager component 118 can still decide to cluster communication device 102, 104, and 106 to form a group of communication devices and can still decide that communication device 102 is the most desirable (e.g., suitable, acceptable, optimal) communication device to be selected to be the host communication device for the group of communication devices, in accordance with the defined grouping criteria (e.g., when doing so is in accordance with the defined grouping criteria).

To further illustrate aspects of the disclosed subject matter by further alternating the example scenario, after forming the group of communication devices (e.g., 102, 104, 106, ...) and selecting communication device 102 as the host communication device for the group, the resource manager component 118 can receive and analyze additional information relating to the respective device characteristics associated with the communication devices (e.g., 102, 104, 106, 108, 110). Based at least in part on the results of the analysis of the additional information, the resource manager component 118 can detect a change in the respective device characteristics associated with the respective communication devices, with such change being that communication device 102 has started streaming video, while communication device 104 continues to send and receive messages, and communication device continues to stream video. The resource manager component 118 can determine whether communication device 102 has the data performance characteristics (e.g., available data bandwidth, suitable data communication speed) to handle the aggregate communications of communication devices (e.g., 102, 104, 106, ... ) of the group on behalf of the group as the host communication device. If the resource manager component 118 determines that the communication device 102 is does not have the data performance characteristics to handle the aggregate communications of the group of communication devices, the resource manager component 118 can determine whether another communication device (e.g., 104, 106, ... ) of the group is to replace the communication device 102 as the host communication device for the group, whether another communication device(s) is to be included in the group and/or to be selected as the host communication device for the group, whether the communication device 102 or another communication device (e.g., 104, 106, ... ) of the group is to be removed from the group, or whether the group of communication devices is to be dissolved, in accordance with the defined grouping criteria.

As another example that can illustrate aspects of the disclosed subject matter, the resource manager component 118 can facilitate setting up the clustering of communication devices and the interconnections of communication devices (e.g., 102, 104, 106, ... ) in a group of communication devices to enable and allow data to be communicated via multiple hops. For instance, if communication device 102 is the host communication device for the group of communication devices (e.g., 102, 104, 106, ... ), and communication device 106 is communicating an item of information, instead of communicating the item of information directly to the host communication device 102 for communication to RAN 114 by the host communication device 102, the communication device 106 can communicate the item of information to communication device 104 and communication device 104 can communicate the item of information to the host communication device 102. One reason this hopping may be done is due to the communication device 106 having a relatively poor communication connection with the host communication device 102, while having a relatively good communication connection with communication device 104, where communication device 104 has good communication connections with both communication devices 102 and 106.

In some implementations, the resource manager component 118 can apply respective weighting factors (e.g., clustering weighting factors) to respective device characteristics associated with respective communication devices (e.g., communication devices 102, 104, 106, 108, 110, ... ) to generate respective weighted values (e.g., clustering weighted values) to facilitate determining and achieving a desired clustering of communication devices into a group, in accordance with the defined grouping criteria and associated algorithm(s). The resource manager component 118 (or another component) can determine the respective weighting factors to be applied to the respective device characteristics based at least in part on the respective importance or relevance of the respective device characteristics in relation to each other with respect to achieving a desired (e.g., suitable, favorable, optimal) selection and clustering of communication devices. For example, when in accordance with the defined group criteria, the resource manager component 118 can apply a heavier or larger weighting factor to respective transit vector information relating to current and/or predicted future transit vectors associated with respective communication devices (e.g., communication devices 102, 104, 106, 108, 110, ... ) than a weighting factor that is applied to respective data performance information (e.g., available bandwidth, data communication speed) relating to current and/or predicted future data performance associated with the respective communication devices (e.g., communication devices 102, 104, 106, 108, 110, ... ). This can be done to give more weight to the transit vector information than the data performance information, as the transit vector information can be more significant or relevant than the data performance information in determining which communication devices to select to be in a group of communication devices to achieve a desired (e.g., suitable, favorable, optimal) clustering of communication devices into a group.

The resource manager component 118 can determine (e.g., calculate) respective weighted clustering scores associated with the respective communication devices based at least in part on the respective weighted values (e.g., clustering weighted values) relating to the respective device characteristics associated with the respective communication devices. The resource manager component 118 can determine or identify a subset of communication devices that can be clustered to form a group of communication devices based at least in part on the respective weighted clustering scores associated with the communication devices. For example, the resource manager component 118 can select a desired number of communication devices having the highest weighted clustering scores, relative to other communication devices having lower weighted clustering scores, to be clustered to form the group of communication devices, or can select communication devices that have weighted clustering scores that satisfy (e.g., meet or exceed) a minimum threshold weighted clustering score for inclusion in the group of communication devices, in accordance with the defined grouping criteria and associated algorithm(s).

In certain implementations, with respect to communication devices clustered into a group of communication devices, the resource manager component 118 can apply respective weighting factors (e.g., host weighting factors) to respective device characteristics associated with respective communication devices (e.g., communication devices 102, 104, 106, 108, 110, . . . ) to generate respective weighted values (e.g., host weighted values) to facilitate determining one or more communication devices that can act as a host communication device on behalf of the group of communication devices, in accordance with the defined grouping criteria and associated algorithm(s). The resource manager component 118 (or another component) can determine the respective weighting factors to be applied to the respective device characteristics based at least in part on the respective importance or relevance of the respective device characteristics in relation to each other with respect to determining a desired (e.g., suitable, favorable, optimal) communication device(s) to act as a host device for the group. For example, when in accordance with the defined group criteria, the resource manager component 118 can apply a heavier or larger weighting factor to respective power availability information relating to respective current and/or predicted future power availability associated with respective communication devices (e.g., communication devices 102, 104, 106, . . . ) of the group than a weighting factor that can be applied to respective signal strength information relating to respective current and/or predicted future signal strengths associated with the respective communication devices (e.g., communication devices 102, 104, 106, . . . ). This can be done to give more weight to the power availability information than the signal strength information, as the power availability information can be more significant or relevant than the signal strength information in determining which communication device(s) is most desirable (e.g., suitable, favorable, optimal) to be selected as the host communication device to act on behalf of the group of communication devices.

The resource manager component 118 can determine (e.g., calculate) respective weighted host scores associated with the respective communication devices (e.g., communication devices 102, 104, 106, . . . ) of the group based at least in part on the respective weighted values (e.g., host weighted values) relating to the respective device characteristics associated with the respective communication devices. The resource manager component 118 can determine or identify a communication device(s) (e.g., communication device 102) that can be selected as the host communication device(s) based at least in part on the respective weighted clustering scores associated with the communication devices, in accordance with the defined grouping criteria. For instance, the resource manager component 118 can select a communication device of the group that has a highest weighted host score, as compared to the weighted host scores of the other communication devices of the group, to be the host communication device for the group to facilitate communications for the communication devices of the group via the host communication device.

With regard to a clustered group of communication devices (e.g., 102, 104, 106, . . . ) with a host communication device (e.g., 102), the host communication device (e.g., 102) can facilitate communication of information between the other communication devices (e.g., 104, 106, . . . ) of the group (and itself) and the RAN 114, via the host communication device. The host communication device (e.g., 102) can receive a first item of information from a communication device (e.g., 104) of the group, wherein the first item of information can be part of a voice call, part of a data session, part of a message (e.g., SMS, MMS), or part of another type of information communication. To facilitate identifying the first item of information as being associated with the communication device (e.g., 104), a first tag can be associated with (e.g., linked to, applied to) with the first item of information, wherein the first tag can be associated with the communication device (e.g., 104). In some implementations, the host communication device (e.g., 102) can associate the first tag with the first item of information. In other implementations, the communication device (e.g., 104) can associate the first tag with the first item of information. In still other implementations, the resource manager component 118 can associate the first tag with the first item of information. The first tag can comprise identifying information (e.g., mobile device identifier) that can identify the communication device (e.g., 104) from which the first item of information was sent. The host communication device (e.g., 102) can communicate the first item of information and associated first tag from the host communication device to the base station 112 associated with a RAN 114 to facilitate delivery of the first item of information and associated first tag to the desired destination (e.g., a communication device at the desired destination).

The host communication device (e.g., 102) also can receive a second item of information from another communication device (e.g., 106) of the group, wherein the second item of information can be part of a voice call, part of a data session, part of a message (e.g., SMS, MMS), or part of another type of information communication. To facilitate identifying the second item of information as being associated with the other communication device (e.g., 106), a second tag can be associated with the second item of information, wherein the second tag can be associated with the other communication device (e.g., 106). In some implementations, the host communication device (e.g., 102) can associate the second tag with the second item of information. In other implementations, the other communication device (e.g., 106) can associate the second tag with the second item of information. In still other implementations, the resource manager component 118 can associate the second tag with the second item of information. The second tag can comprise identifying information (e.g., mobile device identifier) that can identify the other communication device (e.g., 106) from which the second item of information was sent. The host communication device (e.g., 102) can communicate the second item of information and associated second tag from the host communication device to the base station 112 associated with a RAN 114 to facilitate delivery of the second item of information and associated second tag to the desired destination (e.g., a communication device at the desired destination).

The host communication device (e.g., 102) also can facilitate communications from other communication devices in the communication network 116 to communication devices (e.g., 104, 106) in the group for which it is acting as a host. For instance, a third item of information can be communicated from a source communication device with a communication device (e.g., 104) of the group as a delivery destination for the third item of information, wherein the communication device (e.g., 104) can be associated with the first tag. The third item of information can be part of a voice call, part of a data session, part of a message, or part of another type of information communication. The RAN 114 and base station 112 can facilitate communicating the third item of information and the first tag, which can be associated with the third item of information to the host communication device (e.g., 102). The host communication device (e.g., 102) for the group can receive the third item of information from the base station 112. The first tag can be associated with the communication device (e.g., 104) to facilitate identifying the third item of information as being associated with the communication device (e.g., 104). In some implementations, the source communication device can associate the first tag with the third item of information. In other implementations, the RAN 114 can associate the first tag with the third item of information. In accordance with still other implementations, the resource manager component 118 can associate the first tag with the third item of information. The host communication device (e.g., 102) can communicate the third item of information (and associated first tag, if desired) to the communication device (e.g., 104) based at least in part on the first tag identifying the communication device (e.g., 104) as the device to which the third item of information is to be delivered.

In some implementations, a round-robin technique for hosting a cluster of communication devices can be employed, whereby more than one communication device of the group can be selected to be the host communication device, wherein the selected communication devices alternate and rotate as the host communication device for the group at respective times. For instance, the resource manager component 118 can determine or identify a desired number of communication devices of the group that have the highest weighted host scores, relative to the weighted host scores associated with other communication devices of the group, to be host communication devices for the group of communication devices at respective times, or can select communication devices of the group that have weighted host scores that satisfy (e.g., meet or exceed) a minimum threshold weighted host score for being selected as a host communication device for the group of communication devices, in accordance with the defined grouping criteria and associated algorithm(s).

By employing this round-robin technique to facilitate rotating the host duties of host communication device among multiple communication devices in the group (e.g., communication device 102 and communication devices 104 and/or 106 (or another communication device(s) in the group)), the resource manager component 118 can facilitate equal sharing, or at least substantially equal sharing, of duties as host communication device among such multiple communication devices of the group, in accordance with the defined grouping criteria and associated algorithm(s). This equal sharing or substantially equal sharing of the host duties as host communication device among the multiple communication devices of a group can facilitate desirable radio resource pooling and communications for the group of communication devices without unduly taxing the resources of any one particular communication device (e.g., communication device 102) acting as a host communication device for the group (e.g., communication devices 102, 104, 106, . . . ). In some implementations, the communication devices in the group can communicate their respective available data aggregation buffers, for example, to each other over a personal area network (PAN) or VLAN, and/or to the resource manager component 118, to facilitate determining which communication devices are suitable to act as host communication devices for the group of communication devices.

Figure 2:
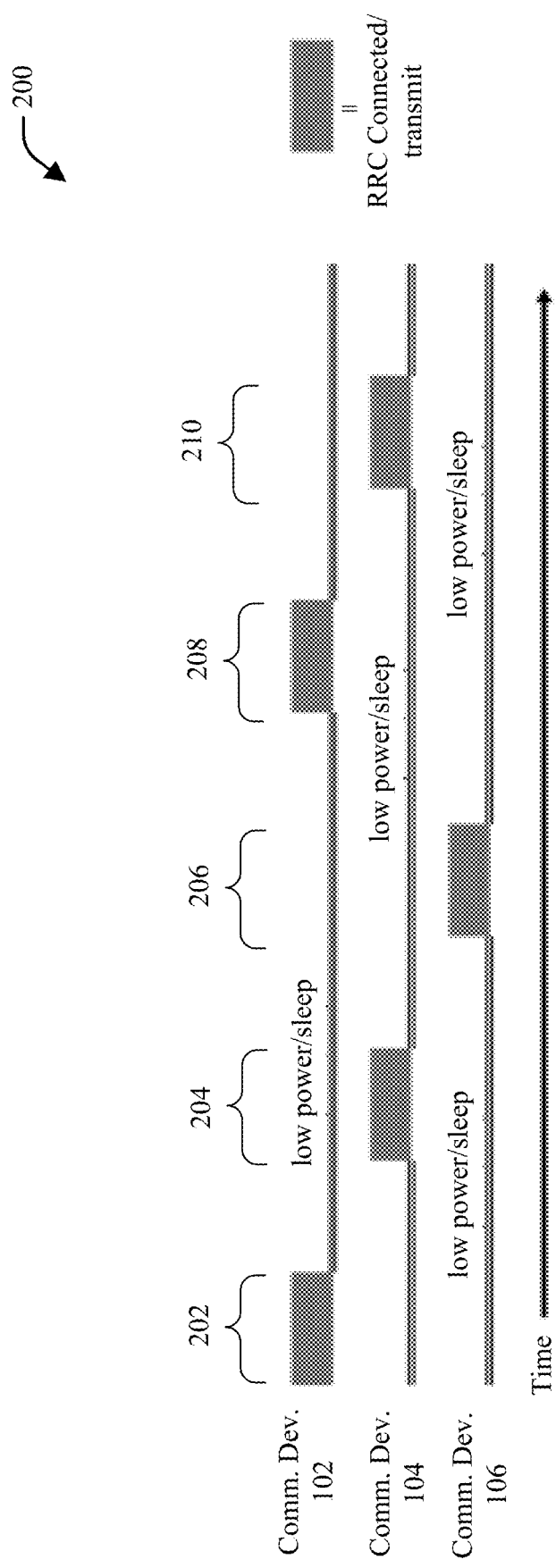
FIG. 2 depicts a diagram of an example round-robin schedule of alternating communication devices of the group of communication devices as host communication device, in accordance with various aspects and embodiments of the disclosed subject matter.

In this regard, referring briefly to FIG. 2 (along with FIG. 1), FIG. 2 depicts a diagram of an example round-robin schedule 200 of alternating communication devices of the group of communication devices as host communication device, in accordance with various aspects and embodiments of the disclosed subject matter. The resource manager component 118 can determine and generate the round-robin schedule 200, in accordance with the defined grouping criteria and associated algorithm(s).

As illustrated in the round-robin schedule 200, the first communication device 102 can act as the host communication device for the group (e.g., cluster) during a first time period 202, while the second communication device 104 and third communication device 106 can be in a low power or sleep mode, for example. As also illustrated in the round-robin schedule 200, during a second time period 204, the host duties for the group can alternate or rotate to a different communication device. For instance, during the second time period 204, the second communication device 104 can act as the host communication device for the group, while the first communication device 102 and third communication device 106 can be in a low power or sleep mode.

As further illustrated in the round-robin schedule 200, during a third time period 206, the hosting duties for the group can again alternate or rotate to a different communication device. For example, during the third time period 206, the third communication device 106 can act as the host communication device for the group, while the first communication device 102 and second communication device 104 can be in a low power or sleep mode. During the fourth time period 208, the host duties for the cluster can rotate back to the first communication device 102, while the second communication device 104 and third communication device 106 can be in a low power or sleep mode. During the fifth time period 210, the host duties for the group can rotate to the second communication device 104, while the first communication device 102 and third communication device 106 can be in a low power or sleep mode. This round-robin schedule for alternating host duties for the group between selected communication devices of the group can continue, for example, until the resource manager component 118 determines that one of the communication devices of this subset of communication devices selected to be a host communication device for the group is to be removed from the subset and/or replaced, and/or until the resource manager component 118 determines that the round-robin schedule for the group is to be modified or terminated (e.g., discontinued).

It is to be appreciated and understood that, while this example round-robin schedule 200 illustrates employing three communication devices to act as a host communication device for the group of communication devices, the disclosed subject matter is not so limited, as, in accordance with various implementations, there also can be less than three communication devices or more than three communication devices that can be determined and selected to act a host communication device for the group of communication devices, in accordance with the defined grouping criteria.

Figure 3:
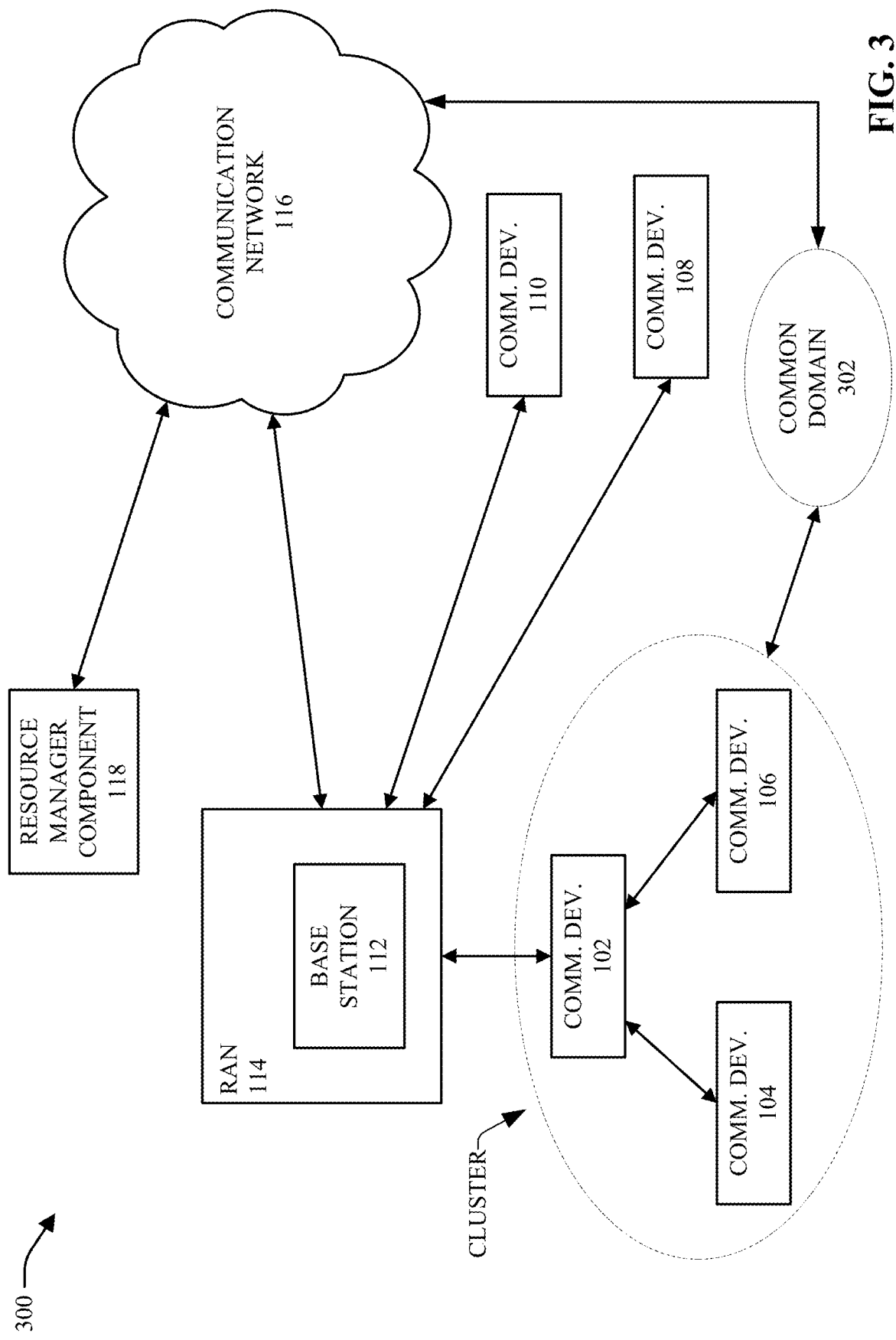
FIG. 3 illustrates a diagram of an example system that can facilitate clustering respective subsets of communication devices into respective clusters, in connection with a social group affiliation or other type of common domain, and selecting a host communication device(s) that can act on behalf of the communication devices of a cluster of communication devices with regard to communications between the communication devices of the cluster and a RAN(s) associated with a communication network, in accordance with various aspects and embodiments of the disclosed subject matter.

Turning briefly to FIG. 3, FIG. 3 illustrates a block diagram of an example system 300 that can facilitate clustering respective subsets of communication devices into respective clusters, in connection with a social group affiliation or other type of common domain, and selecting a host communication device(s) that can act on behalf of the communication devices of a cluster of communication devices with regard to communications between the communication devices of the cluster and a RAN(s) associated with a communication network, in accordance with various aspects and embodiments of the disclosed subject matter. The system 300 can comprise communication devices, including communication devices 102, 104, 106, 108, and 110, base station 112, RAN 114, communication network 116, and resource manager component 118. The respective components (e.g., communication devices, base station 112, RAN 114, communication network 116, and resource manager component 118) can comprise respective features and functions, such as more fully described herein.

In some implementations, users of communication devices who can be associated or affiliated with a common domain 302 (e.g., a social networking group, such as a social networking group associated with an online social networking service; a company, such as a company providing package delivery services, a wireless communication services carrier, a company that sells products or services, . . . ), or an entity associated with the users (e.g., who can be employees of the entity), can desire or can allow (e.g., by the users and/or entity opting in) for the clustering of communication devices of the users into a group, for example, when the clustering of their communication devices into a group is feasible and desirable (e.g., suitable, acceptable, optimal), in accordance with the defined grouping criteria. The common domain 302 also can be referred to as a common management domain.

In certain implementations, the communication devices (e.g., 102, 104, 106, . . . ) associated with the common domain 302, or another communication device associated with an entity associated with the common domain 302, can communicate to or register with the RAN 114 or other component in or associated with the communication network 116 to indicate that these communication devices (e.g., 102, 104, 106, . . . ) are associated with the common domain 302 and that it is acceptable to cluster these communication devices (e.g., 102, 104, 106, . . . ) into a group, for example, when doing so is otherwise in accordance with the defined grouping criteria based at least in part on the respective device characteristics associated with the respective communication devices (e.g., 102, 104, 106, . . . ).

In accordance with some implementations, the resource manager component 118 can be a stand-alone component or device in or associated with the communication network 116. In other implementations, all or a portion (e.g., an agent component) of the resource manager component 118 can be part of another device(s), such as the communication devices (e.g., 102, 104, 106, . . . ), the RAN 114, or a network device of the communication network 116.

There can be at least three levels of affiliation associated with the communication devices. The at least three levels of affiliation can comprise, for example, network provider associated with the communication network 116, a management domain (e.g., associated with the common domain 302), and crowd sourcing peering (e.g., grass roots peering) of communication devices by users of the communication devices.

The negotiating to facilitate the clustering of communication devices into a group (e.g., 102, 104, 106, . . . ) can occur in a variety of different ways. For example, the communication devices (e.g., 102, 104, 106, . . . ) can negotiate with the RAN 114 to indicate that the communication devices (e.g., 102, 104, 106, . . . ) are available to and/or desire to be clustered into a group, e.g., when doing so is feasible and appropriate (e.g., suitable, acceptable, optimal), in accordance with the defined grouping criteria. Such negotiation between the communication devices (e.g., 102, 104, 106, . . . ) and the RAN 114 can be facilitated via the resource manager component 118 (e.g., as a stand-alone component) and/or via agent components of the resource manager component 118 that can reside in the communication devices (e.g., 102, 104, 106, . . . ) and/or RAN 114.

As another example, a communication device associated with an entity (e.g., a company; a social networking group) that is associated with or part of the common domain 302 can negotiate with the RAN 114 to indicate that the communication devices (e.g., 102, 104, 106, . . . ) are associated with the common domain 302, and the communication devices (e.g., 102, 104, 106, . . . ) are available to be clustered into a group and it is desired to have them clustered into a group, e.g., when doing so is feasible and appropriate (e.g., suitable, acceptable, optimal), in accordance with the defined grouping criteria. Such negotiation between the communication device associated with the entity and the RAN 114 can be facilitated via the resource manager component 118 (e.g., as a stand-alone component) and/or via agent components of the resource manager component 118 that can reside in the communication device and/or RAN 114.

For instance, communication devices 102, 104, and 106 can be associated with the entity (e.g., communication devices that the entity, a company, issues to its employees for work purposes; communication devices of users associated with a social networking group) can be traveling in a certain area, wherein the communication devices 102, 104, and 106 are in close enough proximity to each other to be able to interconnect and communicate with each other. Based in part on the negotiation between the communication device associated with the entity and the RAN 114 (e.g., as facilitated by the resource manager component 118), the resource manager component 118 can analyze the respective device characteristics associated with the respective communication devices (e.g., 102, 104, 106) to determine whether to cluster these communication devices into a group, and, if so, to select a communication device(s) of the group to act as a host communication device on behalf of the communication devices of the group, in accordance with the defined grouping criteria.

There can be a number of reasons for wanting to cluster communications devices into a group. With regard to a network provider, the network provider can desire clustering of communication devices with a host communication device acting on behalf of the group because doing so can facilitate reducing the number of communication devices requesting connections to the base station 112, RAN 114, or communication network 116, reducing the number of communication devices seeking or requesting resource allocations from the base station 112, RAN 114, or communication network 116, and/or reducing contention between communication devices attempting to access the base station 112, RAN 114, or communication network 116. With regard to a company associated with the common domain 302, the company may desire to create its own federated network of communication devices with regard to communication devices used by users who are employees of the company. With regard to users associated with a common domain 302 (e.g., social networking group), the users can desire to crowd source and cluster their communication devices to facilitate ensuring that all of the communications by their communication devices performed as desired (e.g., efficiently completed).

As still another example, the users of the communication devices (e.g., 102, 104, 106) can be part of a common domain 302 in connection with a social networking group. The users can desire to have their communication devices (e.g., 102, 104, 106) clustered into a group (e.g., to crowd source their communication devices with peers) when feasible and appropriate. The communication devices 102, 104, and 106 can be traveling in a certain area, wherein the communication devices 102, 104, and 106 are in close enough proximity to each other to be able to interconnect and communicate with each other. The communication devices 102, 104, and 106 can negotiate with each other (e.g., as facilitated by the resource manager component 118 and/or its agent components) to indicate to each other that clustering of the communication devices is to be done if feasible and appropriate. Based in part on the negotiation between the communication devices 102, 104, and 106 (e.g., as facilitated by the resource manager component 118), the resource manager component 118 can analyze the respective device characteristics associated with the respective communication devices (e.g., 102, 104, 106) to determine whether to cluster these communication devices into a group, and, if so, to select a communication device(s) of the group to act as a host communication device on behalf of the communication devices of the group, in accordance with the defined grouping criteria.

The negotiations and/or operations relating to clustering of communication devices can be performed in a protocol agnostic manner, wherein a variety of different protocols can be used to facilitate the performance of negotiations and/or operations relating to clustering of communication devices. For instance, a client organization (e.g., a company) associated with the common domain 302, or a peer group of users of communication devices (e.g., 102, 104, 106), can or may use a VLAN, asynchronous transfer mode (ATM), or multi-protocol label switching (MPLS), to facilitate performing negotiations and/or operations relating to clustering of communication devices. A network provider, via the RAN 114, can or may use access point names (APNs) to facilitate performing negotiations and/or operations relating to clustering of communication devices.

It is to be appreciated and understood that, in some instances, multiple types of negotiations and communications, and multiple types of protocols can be employed simultaneously. For example, with regard to primary, secondary, tertiary, and/or quadentiary, etc., type networks, at a fourth level to the network, there can be peer-to-peer communications between communication devices (e.g., 102, 104, and/or 106) with respect to a social media context (e.g., a social networking group associated with a common domain 302), wherein such communications between the communication devices (e.g., 102, 104, and/or 106) can be facilitated using one type of protocol (e.g., a mesh peering protocol, such as optimized link state routing (OLSR) protocol, which can work well in a short range area). Meanwhile, simultaneously, at the primary level, a network provider associated with the RAN 114 can desire to use its communication network 116 as efficiently as possible, and, as a result, the RAN 114 can use a different type of communication protocol that can enable the RAN 114 to manage the access of the communication devices (e.g., 102, 104, and/or 106) to the communication network 116 more efficiently (e.g., so that the communication network 116 has relatively fewer communication devices contending with it). There can be various types of negotiations and grouping contexts using various types of appropriate protocols, for example, with respect to a primary-to-secondary network configuration, amongst secondaries of a network configuration, with respect to a secondary-to-tertiary network configuration, amongst tertiaries of a network configuration, with respect to a tertiary-to-quadentiary network configuration, or amongst quadentiaries of a network configuration, etc.

Figure 4:
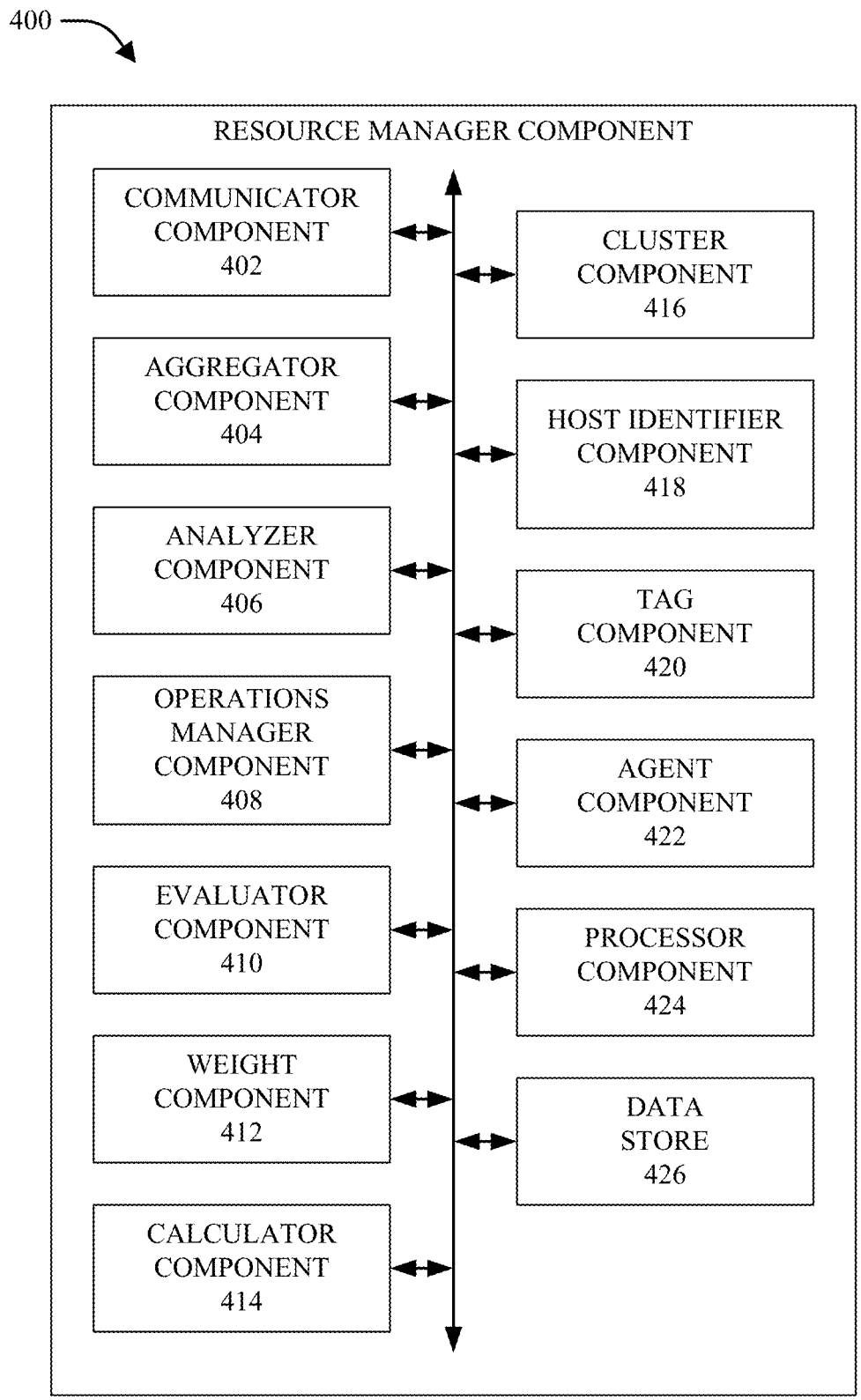
FIG. 4 presents a block diagram of an example resource manager component, in accordance with various aspects and embodiments of the disclosed subject matter.

FIG. 4 presents a block diagram of an example resource manager component 400, in accordance with various aspects and embodiments of the disclosed subject matter. The resource manager component 400 can be employed to facilitate determining whether to cluster communication devices and which communication devices to cluster into a group, and determine which communication device(s) of a group is to be used as a host communication device, in accordance with the defined grouping criteria. In accordance with various implementations, all or part of the resource manager component 400 can reside in the cloud.

The resource manager component 400 can comprise a communicator component 402 that can transmit information from the resource manager component 400 to another component or device (e.g., communication device, RAN) and/or can receive information from another component or device. For instance, the communicator component 402 can receive information relating to device characteristics from communication devices associated with the communication network. The communicator component 402 also can communicate instructions relating to clustering of communication devices into a group and/or selection of a communication device(s) of a group to be a host communication device that can act on behalf of the communication devices of the group with regard to communications between the communication devices and the RAN.

The resource manager component 400 also can include an aggregator component 404 that can aggregate data received (e.g., obtained) from various entities (e.g., communicator component 402 or another component(s) of the resource manager component 400, communication network, application, a server or other communication device, processor, data store, etc.). The aggregator component 404 can correlate respective items of data (e.g., activity data) based at least in part on type of data (e.g., information relating to device characteristics associated with communication devices, respective types of device characteristic related data, voice data, messaging data, Internet-related data, application-related data, signaling, pinging), source of the data, time or date that the data was generated or received, etc., to facilitate analyzing of the data by the analyzer component 406. For example, the aggregator component 404 can aggregate data (e.g., information relating to device characteristics) associated with respective communication devices to facilitate determining whether to cluster communication devices into a group and determine which communication device(s) of a group is to be used as a host communication device.

The resource manager component 400 can comprise the analyzer component 406, which can analyze data (e.g., information relating to device characteristics) to facilitate determining whether to cluster communication devices into a group and determine which communication device(s) of a group is to be used as a host communication device. For instance, the analyzer component 406 can analyze respective information relating to transit vectors (and/or other device characteristics) associated with respective communication devices to facilitate determining whether to cluster communication devices into a group and/or determining which communication devices are to be included in group. As another example, the analyzer component 406 can analyze the respective power availability data associated with respective communication devices of a cluster of communication devices to facilitate determining which communication device of the cluster has the most power (e.g., battery power) available and/or determining whether a communication device of the cluster is plugged into AC power or is predicted to be plugged into AC power at a future time (e.g., in the near future).

In accordance with various implementations, the resource manager component 400 also can comprise an operations manager component 408, an evaluator component 410, a weight component 412, a calculator component 414, a cluster component 416, a host identifier component 418, a tag component 420, and an agent component 422. The respective components (e.g., operations manager component 408, evaluator component 410, a weight component 412, a calculator component 414, a cluster component 416, a host identifier component 418, a tag component 420, and an agent component 422) can comprise the respective features and functions, such as more fully described herein (e.g., including as more fully described herein with regard to the resource manager component).

The operations manager component 408 can control (e.g., manage) operations associated with the resource manager component 400. For example, the operations manager component 408 can facilitate generating instructions to have components of the resource manager component 400 perform operations, and can communicate respective instructions to respective components (e.g., communicator component 402, aggregation component 404, analyzer component 406, . . . ) of the resource manager component 400 to facilitate performance of operations by the respective components of the resource manager component 400 based at least in part on the instructions, in accordance with the defined grouping criteria and associated algorithms (e.g., predictive algorithm). The operations manager component 408 also can facilitate controlling data flow between the respective components of the resource manager component 400 and controlling data flow between the resource manager component 400 and another component(s) or device(s) (e.g., communication device, RAN) associated with (e.g., connected to) the resource manager component 400.

The evaluator component 410 can evaluate information, such as information relating to device characteristics associated with communication devices, to generate evaluation results that can be used to facilitate determining whether to cluster communication devices and which communication devices to cluster into a group, and determine which communication device(s) of a group is to be used as a host communication device, in accordance with the defined grouping criteria. The information can be raw information, weighted information (e.g., as weighted using the weight component 412), or calculation results based in part on calculations performed by the calculator component 414.

The weight component 412 can apply respective weighting factors (e.g., clustering weighting factor, host weighting factor) to respective items of information relating to device characteristics associated with communication devices based at least in part on the type of device characteristic and whether the weighted data derived from the weighting factor is to be used to determine whether to cluster communication devices into a group or to determine which communication device(s) of a cluster is to be selected to be a host communication device for the cluster. For instance, the weight component 412 can utilize different weighting factors with respect to different types of device characteristics and/or can utilize different weighting factors (e.g., clustering weighting factor, host weighting factor) with respect to different uses (e.g., determining whether to cluster communication devices, determining which communication device is to be a host communication device of a cluster) of the weighted data relating to the device characteristics.

The calculator component 414 can perform calculations on information (e.g., information that has data values) to generate calculation results in connection with evaluations being made by the evaluator component 410. For instance, the calculator component 414 can calculate a weighted value relating to a device characteristic associated with a communication device based on a data value relating to the device characteristic associated with the communication device and an applicable weighting factor (e.g., clustering weighting factor, host weighting factor). The calculator component 414 also can calculate weighted scores (e.g., weighted clustering scores, weighted host scores) associated with communication devices based at least in part on respective information relating to device characteristics associated with communication devices and respective applicable weighting factors. The calculator component 414 further can calculate or measure the distance between a current location of a communication device traveling in a vehicle on a freeway and a next exit ramp that the vehicle will encounter, and/or can calculate the amount of time it will take or likely will take the communication device in the vehicle to reach the next exit ramp.

The cluster component 416 can be employed to determine whether a subset of communication devices (e.g., communication devices operating in a coverage area associated with a RAN) are to be clustered together to form a group of communication devices, and, if it is determined that a group of communication devices is to be formed, determine which communication devices are to be included in the cluster, based at least in part on the evaluation results (e.g., evaluation results based in part on respective weighted clustering scores associated with communication devices) generated by the evaluator component 410, in accordance with the defined grouping criteria. The cluster component 416 also can perform or facilitate performing the clustering of the subset of communication devices to form the group of communication devices. For example, the cluster component 416 can generate clustering instructions that can be communicated to the one or more of the communication devices (e.g., host communication device) of the group, wherein, in response to receiving the clustering instructions, the subset of communication devices can interconnect and cooperate with each other to cluster together to form the group of communication devices.

The host identifier component 418 can identify a communication device(s) of a clustered group of communication devices that can be a host (e.g., primary) communication device that can act on behalf of the communication devices of the group to facilitate communications between the communication devices in the group and the RAN, via the host communication device, based at least in part on evaluation results (e.g., evaluation results based in part on respective weighted host scores associated with communication devices) generated by the evaluator component 410, in accordance with the defined grouping criteria. In some implementations, the host identifier component 418 can employ a round-robin technique for selecting and using respective communication devices of a group as a host communication device at respective times, wherein the selected communication devices alternate or rotate handling of the host duties for the group, as more fully disclosed herein. The host identifier component 418 can generate a round-robin schedule that can be communicated to a communication device (e.g., one of the host communication devices) of the group to facilitate instructing the communication devices in the group regarding how to they are to operate (e.g., cooperate with each other) to have the respective host communication devices of the group handle the host duties for the group in accordance with the round-robin schedule.

The tag component 420 can be employed to facilitate tagging respective items of information being communicated to or from respective communication devices of a group with respective tags (e.g., identifying tags). The tag component 420 can facilitate associating a tag with an item of information, wherein the tag can be associated with a communication device of the group that is sending the item of information or can be associated with the communication device that is supposed to receive the item of information. The tag can be or can comprise a mobile device identifier associated with a communication device, for example.

The agent component 422 can be employed to facilitate enabling communication devices to work together or negotiate, and/or devices in or associated with a communication network to negotiate with communication devices, to facilitate clustering of communication devices into a group of communication devices. In accordance with various implementations, agent components 422 can be included in certain communication devices, in a RAN, and/or in the communication network.

The resource manager component 400 can comprise a processor component 424 that can work in conjunction with the other components (e.g., communicator component 402, aggregator component 404, analyzer component 406, operations manager component 408, evaluator component 410, weight component 412, calculator component 414, cluster component 416, host identifier component 418, tag component 420, agent component 422, data store 426) to facilitate performing the various functions of the resource manager component 400. The processor component 424 can employ one or more processors, microprocessors, or controllers that can process data, such as information relating to device characteristics associated with communication devices, weighting factors, cluster-related information, host-related information, tags, the communication network, traffic flows, policies, defined grouping criteria, algorithms, protocols, interfaces, tools, and/or other information, to facilitate operation of the resource manager component 400, as more fully disclosed herein, and control data flow between the resource manager component 400 and other components (e.g., communication network, base stations, RAN, communication devices, data sources, applications) associated with the resource manager component 400.

The resource manager component 400 also can include a data store 426 that can store data structures (e.g., user data, metadata), code structure(s) (e.g., modules, objects, hashes, classes, procedures) or instructions, information relating to device characteristics associated with communication devices, weighting factors, cluster-related information, host-related information, tags, the communication network, traffic flows, policies, defined grouping criteria, algorithms, protocols, interfaces, tools, and/or other information, to facilitate controlling operations associated with the resource manager component 400. In an aspect, the processor component 424 can be functionally coupled (e.g., through a memory bus) to the data store 426 in order to store and retrieve information desired to operate and/or confer functionality, at least in part, to the communicator component 402, aggregator component 404, analyzer component 406, operations manager component 408, evaluator component 410, weight component 412, calculator component 414, cluster component 416, host identifier component 418, tag component 420, agent component 422, data store 426, etc., and/or substantially any other operational aspects of the resource manager component 400.

Figure 5:
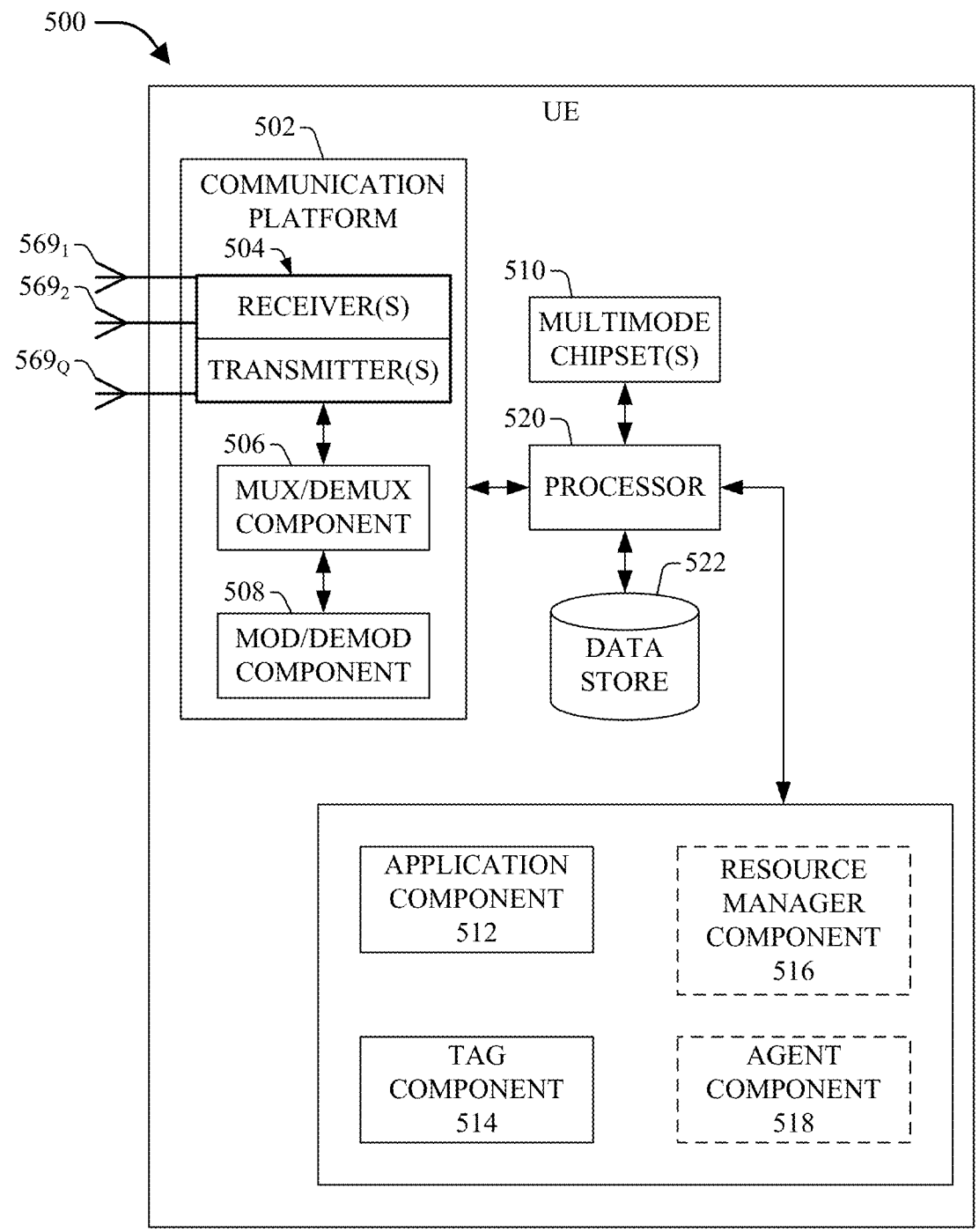
FIG. 5 depicts a block diagram of an example user equipment (UE) in accordance with an aspect of the disclosed subject matter.

FIG. 5 depicts a block diagram of an example UE 500 (e.g., communication device) in accordance with an aspect of the disclosed subject matter. In an aspect, the UE 500 can be a multimode access terminal, wherein a set of antennas $569_1$-$569_Q$ (Q is a positive integer) can receive and transmit signal(s) from and to wireless devices like access points, access terminals, wireless ports and routers, and so forth, which operate in a radio access network. It should be appreciated that antennas $569_1$-$569_Q$ can be part of the communication platform 502, which can comprise electronic components and associated circuitry that can provide for processing and manipulation of received signal(s) and signal(s) to be transmitted, e.g., by receivers and transmitters 504, multiplexer/demultiplexer (mux/demux) component 506, and modulation/demodulation (mod/demod) component 508.

In another aspect, the UE 500 can include a multimode operation chipset(s) 510 that can allow the UE 500 to operate in multiple communication modes in accordance with disparate technical specification for wireless technologies. In an aspect, multimode operation chipset(s) 510 can utilize communication platform 502 in accordance with a specific mode of operation (e.g., voice, GPS). In another aspect, multimode operation chipset(s) 510 can be scheduled to operate concurrently (e.g., when Q>1) in various modes or within a multitask paradigm.

In accordance with various implementations, the UE 500 can comprise an application component 512 that can comprise or be associated with one or more applications that can be utilized by the UE 500. The applications can comprise, for example, a voice or phone application for sending and receiving voice calls, a messaging application for sending and receiving messages (e.g., SMS, MMS), an email application for drafting, sending, and receiving email messages, a web browser application for accessing information on web sites, and/or a GPS and/or mapping application that can be employed to identify the location of the communication device, identify the location of a target destination, and identify a route between two locations (e.g., a current location, and a target destination location).

The UE 500 can comprise a tag component 514 that can facilitate tagging respective items of information being communicated to or from respective UEs of a group with respective tags (e.g., identifying tags). The tag component 514 can facilitate associating a tag with an item of information, wherein the tag can be associated with a UE of the group that is sending the item of information. The tag can be or can comprise a mobile device identifier associated with a UE, for example.

The UE 500 also can (e.g., optionally) include a resource manager component 516 or agent component 518 (of a resource manager component) that can be employed to facilitate enabling the UE to work together or negotiate with other UEs, and/or to facilitate enabling the UE to negotiate with other devices in or associated with a communication network, to facilitate clustering of the UE with other UEs to form a group of UEs.

The UE 500 also can include a processor(s) 520 that can be configured to confer functionality, at least in part, to substantially any electronic component within the UE 500, in accordance with aspects of the disclosed subject matter. The processor(s) 520 can facilitate enabling the UE 500 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. The processor(s) 520 also can facilitate enabling the UE 500 to process data relating to messaging, voice calls, applications, services, wireless states, users, the communication network (e.g., network-related conditions, states, notifications, events, etc.), traffic flows (e.g., traffic flow-related conditions, states, notifications, events, etc.), authentication, etc.

The UE 500 also can contain a data store 522 that can store data structures (e.g., user data, metadata); code structures (e.g., modules, objects, classes, procedures) or instructions; message hashes; data relating to messaging, voice calls, applications, services, wireless states, users, the communication network (e.g., network-related conditions, states, notifications, events, etc.), traffic flows (e.g., traffic flow-related conditions, states, notifications, events, etc.), APIs, authentication, and/or other data; user policies; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; etc. In an aspect, the processor(s) 520 can be functionally coupled (e.g., through a memory bus) to the data store 522 in order to store and retrieve information (e.g., data structures; code structures; instructions; algorithms; data relating to messaging, voice calls, applications, services, wireless states, users, the communication network (e.g., network-related conditions, states, notifications, events, etc.), traffic flows (e.g., traffic flow-related conditions, states, notifications, events, etc.), APIs, authentication, etc.) desired to operate and/or confer functionality, at least in part, to the communication platform 502, multimode operation chipset(s) 510, application component 512, tag component 514, resource manager component 516, agent component 518, and/or substantially any other operational aspects of the UE 500.

Figure 6:
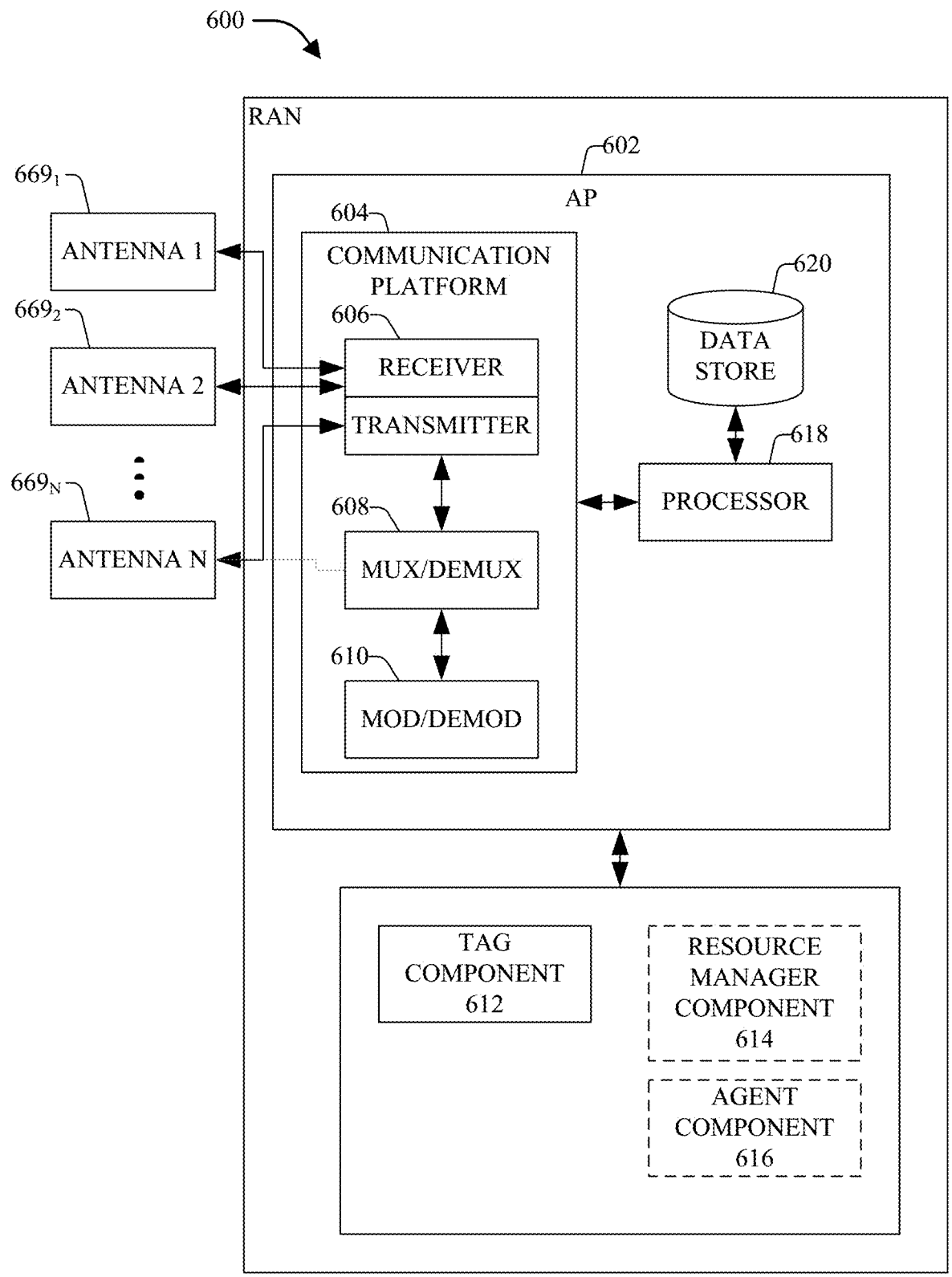
FIG. 6 illustrates a block diagram of an example RAN in accordance with an aspect of the disclosed subject matter.

FIG. 6 illustrates a block diagram of an example RAN 600 comprising an AP (e.g., macro base station, femtocell, or picocell) in accordance with various aspects and implementations of the disclosed subject matter. The RAN 600 can comprise an AP 602 that can receive and transmit signal(s) from and to wireless devices like access points (e.g., base stations, femtocells, or picocells), access terminals (e.g., UEs), wireless ports and routers, and the like, through a set of antennas $669_1$-$669_N$. In an aspect, the antennas $669_1$-$669_N$ can be a part of a communication platform 604, which comprises electronic components and associated circuitry that can provide for processing and manipulation of received signal(s) and signal(s) to be transmitted. In an aspect, the communication platform 604 can include a receiver/transmitter 606 that can convert signal from analog to digital upon reception, and from digital to analog upon transmission. In addition, receiver/transmitter 606 can divide a single data stream into multiple, parallel data streams, or perform the reciprocal operation.

In an aspect, coupled to receiver/transmitter 606 can be a multiplexer/demultiplexer (mux/demux) 608 that can facilitate manipulation of signal in time and frequency space. The mux/demux 608 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 608 can scramble and spread information (e.g., codes) according to substantially any code known in the art, e.g., Hadamard-Walsh codes, Baker codes, Kasami codes, polyphase codes, and so on. A modulator/demodulator (mod/demod) 610 also can be part of the communication platform 604, and can modulate information according to multiple modulation techniques, such as frequency modulation, amplitude modulation (e.g., M-ary quadrature amplitude modulation (QAM), with M a positive integer), phase-shift keying (PSK), and the like.

The RAN 600 also can comprise a tag component 612 that can facilitate tagging respective items of information being communicated to or from respective UEs of a group of UEs with respective tags (e.g., identifying tags). The tag component 612 can facilitate associating a tag with an item of information, wherein the tag can be associated with a UE of the group that is sending the item of information or can be associated with a UE of the group that is to receive the item of information. The tag can be or can comprise a mobile device identifier associated with a UE, for example.

The RAN 600 also can (e.g., optionally) include a resource manager component 614 or agent component 616 (of a resource manager component) that can be employed to facilitate enabling the RAN to negotiate with UEs or other devices, to facilitate clustering UEs together to form a group of UEs The RAN 600 also can comprise a processor(s) 618 that can be configured to confer and/or facilitate providing functionality, at least partially, to substantially any electronic component in or associated with the RAN 600. For instance, the processor(s) 618 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc., to facilitate between an associated UE and the communication network.

In another aspect, the RAN 600 can include a data store 620 that can store data structures; code instructions; rate coding information; information relating to measurement of radio link quality or reception of information related thereto; information relating to establishing a communications connection between a communication device (e.g., UE) and other communication devices; system or device information like policies and specifications; code sequences for scrambling; spreading and pilot transmission; floor plan configuration; access point deployment and frequency plans; scheduling policies; and so on. The processor(s) 618 can be coupled to the data store 620 in order to store and retrieve information (e.g., information relating to multiplexing/demultiplexing or modulation/demodulation, information relating to radio link levels, information relating to establishing communication connections associated with a UE(s) served by the AP 602, etc.) desired to operate and/or confer functionality to the communication platform 604, and/or other operational components of RAN 600.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 7-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 7:
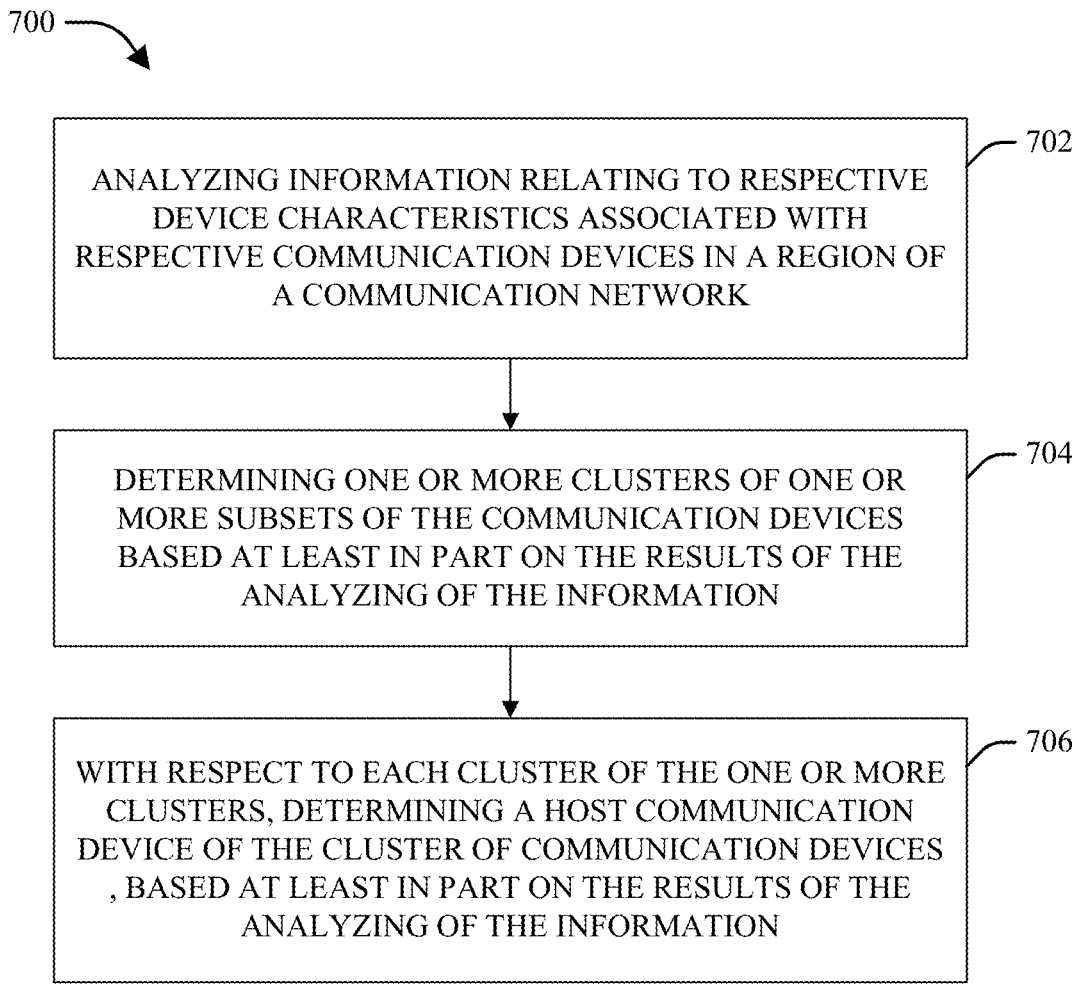
FIG. 7 illustrates a flow diagram of an example method that can facilitate determining a cluster of communication devices and a host communication device that can act on behalf of the communication devices in the cluster, in accordance with various aspects and embodiments of the disclosed subject matter.

FIG. 7 illustrates a flow chart of an example method 700 that can facilitate determining a cluster of communication devices and a host communication device that can act on behalf of the communication devices in the cluster, in accordance with various aspects and embodiments of the disclosed subject matter. The method 700 can be employed by, for example, a resource manager component associated with or in a communication network. In some implementations, all or a portion of the method 700 can be performed in the cloud.

At 702, information relating to respective device characteristics associated with respective communication devices in a region of a communication network can be analyzed. The resource manager component can receive information relating to the respective device characteristics associated with the respective communication devices from the communication devices and/or another source(s) (e.g., RAN, communication network device) associated with the communication devices and the resource manager component. The resource manager component can analyze the information relating to the respective device characteristics associated with the respective communication devices to facilitate determining one or more clusters of communication devices of at least a portion of the communication devices and respective host communication devices (e.g., primary communication devices) for the respective clusters (e.g., groups) of communication devices. The information relating to the respective device characteristics of the respective communication devices can comprise information relating to respective power availability (e.g., amount of power available) of respective communication devices, respective type of power source (e.g., AC power source, DC power source) of the respective communication devices, respective data performances of the respective communication devices, respective signal strengths of the respective communication devices, respective transit vectors of the respective communication devices, respective locations of the respective communication devices, and/or other device characteristics of the respective communication devices. Such information relating to the respective device characteristics of the respective communication devices can comprise information relating to current respective device characteristics of the respective communication devices and/or information relating to (e.g., information that can facilitate determining and/or generating) predicted future respective device characteristics associated with the respective communication devices for a defined time period in the future, wherein the resource manager component can predict the future respective device characteristics using predictive engines (e.g., cloud-based predictive engines), for example.

At 704, one or more clusters of one or more subsets of the communication devices can be determined based at least in part on the results of the analyzing of the information relating to the device characteristics associated with the communication devices, in accordance with the defined grouping criteria. The resource manager component can determine one or more clusters of one or more subsets of the communication devices based at least in part on the results of the analyzing of the information relating to the device characteristics associated with the communication devices, in accordance with the defined grouping criteria and by employing an associated algorithm(s) (e.g., a predictive algorithm).

At 706, with respect to each cluster of the one or more clusters, a host communication device of the cluster of communication devices can be determined, based at least in part on the results of the analyzing of the information relating to the device characteristics associated with the communication devices, in accordance with the defined grouping criteria, wherein the host communication device can act on behalf of itself and the other communication devices in the cluster of communication devices to communicate information between the other communication devices in the cluster and the communication network (e.g., a network device(s) of the communication network) via the host communication device. With respect to each of the one or more clusters of communication devices, the resource manager component can determine or identify a communication device of the cluster (e.g., group) that can be selected as a host communication device that can act on behalf of other communication devices of the cluster of communication devices, in accordance with the defined grouping criteria and the associated algorithm(s), to facilitate communicating data between the other communication devices (and the host communication device itself) and the associated RAN via the host communication device.

In some implementations, to facilitate the determining of the one or more clusters of the communication devices and/or the determining of a host communication device for a cluster of communication devices, the resource manager component can respectively weight (e.g., can determine and apply respective weighting values to) the respective items of information relating to the respective device characteristics of the respective communication devices (e.g., information relating to power availability, type of power source, data performance, signal strength, transit vectors, and/or other device characteristics), for example, as more fully disclosed herein.

Figure 8:
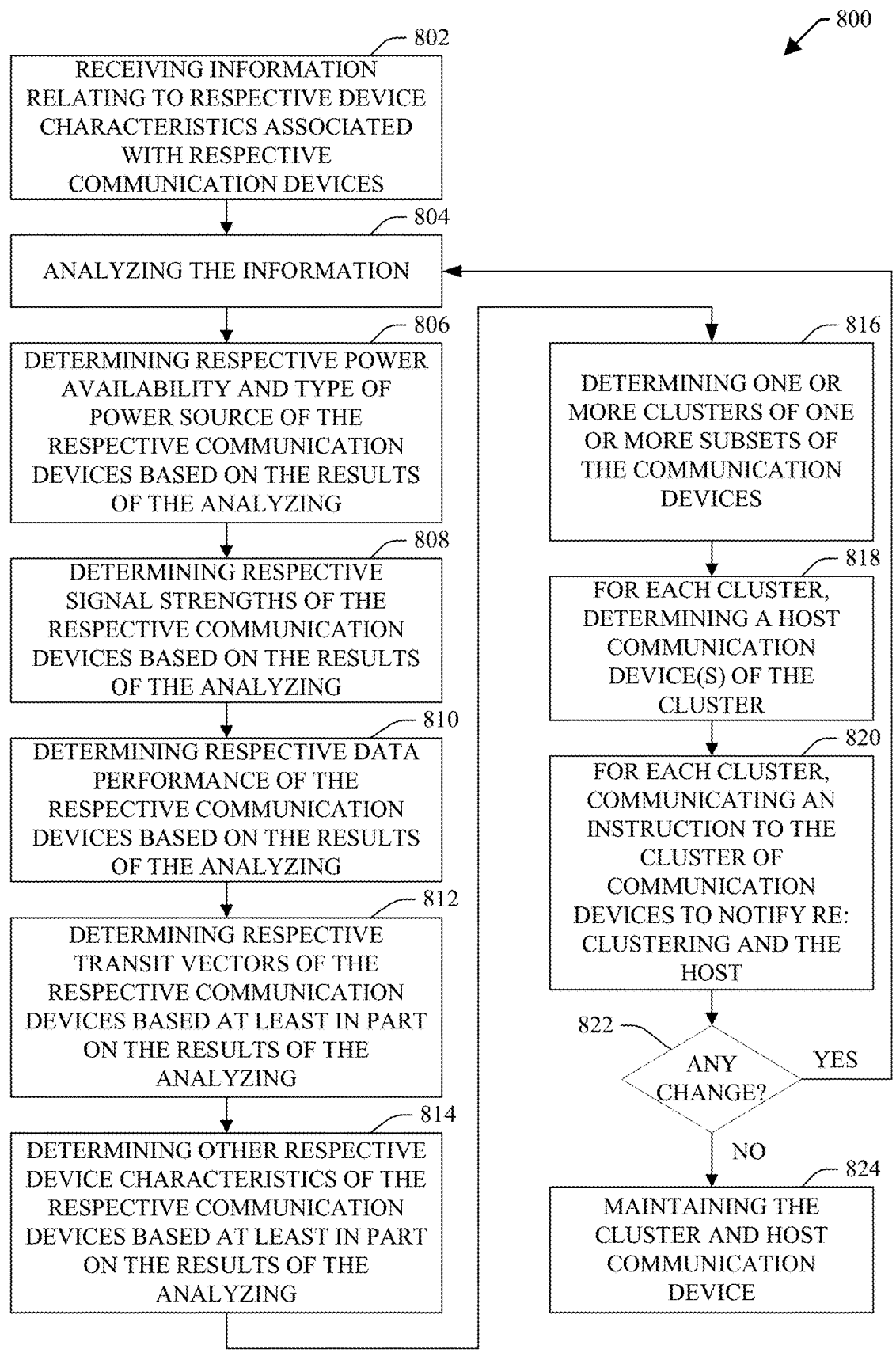
FIG. 8 presents a flow chart of another example method that can facilitate determining a cluster of communication devices and a host communication device that can act on behalf of the communication devices in the cluster, in accordance with various aspects and embodiments of the disclosed subject matter.

FIG. 8 presents a flow chart of another example method 800 that can facilitate determining a cluster of communication devices and a host communication device that can act on behalf of the communication devices in the cluster, in accordance with various aspects and embodiments of the disclosed subject matter. The method 800 can be employed by, for example, a resource manager component associated with or in a communication network. In some implementations, all or a portion of the method 800 can be performed in the cloud.

At 802, information relating to respective device characteristics associated with respective communication devices in a region of a communication network can be received from the respective communication devices or another source(s). The resource manager component can receive information relating to the respective device characteristics associated with the respective communication devices from the communication devices and/or another source(s) (e.g., RAN, communication network device) associated with the communication devices and the resource manager component.

At 804, the information relating to the respective device characteristics associated with the respective communication devices in the region of the communication network can be analyzed. The resource manager component can analyze the information relating to the respective device characteristics associated with the respective communication devices to facilitate determining one or more clusters of communication devices of at least a portion of the communication devices and respective host communication devices for the respective clusters of communication devices. The information relating to the respective device characteristics of the respective communication devices can comprise information relating to, for example, respective power availability (e.g., amount of power available) of respective communication devices, respective type of power source (e.g., AC power source, DC power source) of the respective communication devices, respective data performances of the respective communication devices, respective signal strengths of the respective communication devices, respective transit vectors of the respective communication devices, respective locations of the respective communication devices, and/or other device characteristics of the respective communication devices. Such information relating to the respective device characteristics of the respective communication devices can comprise information relating to current respective device characteristics of the respective communication devices and/or information relating to (e.g., information that can facilitate determining and/or generating) predicted future respective device characteristics of the respective communication devices for a defined time period in the future.

At 806, respective power availability and type of power source of the respective communication devices can be determined based at least in part on the results of the analyzing the information relating to the respective device characteristics associated with the respective communication devices. The resource manager component can determine (e.g., determine, measure, or calculate) the respective power availability and type of power source of the respective communication devices based at least in part on the results of the analyzing the information relating to the respective device characteristics associated with the respective communication devices.

At 808, respective signal strengths of the respective communication devices can be determined based at least in part on the results of the analyzing the information relating to the respective device characteristics associated with the respective communication devices. The resource manager component can determine (e.g., determine, measure, or calculate) the respective signal strengths of the respective communication devices based at least in part on the results of the analyzing the information relating to the respective device characteristics associated with the respective communication devices.

At 810, respective data performance of the respective communication devices can be determined based at least in part on the results of the analyzing the information relating to the respective device characteristics associated with the respective communication devices. The resource manager component can determine (e.g., determine, measure, or calculate) the respective data performance of the respective communication devices based at least in part on the results of the analyzing the information relating to the respective device characteristics associated with the respective communication devices.

At 812, respective transit vectors of the respective communication devices can be determined based at least in part on the results of the analyzing the information relating to the respective device characteristics associated with the respective communication devices. The resource manager component can determine (e.g., determine, measure, or calculate) the respective transit vectors of the respective communication devices based at least in part on the results of the analyzing the information relating to the respective device characteristics associated with the respective communication devices.

At 814, other respective device characteristics of the respective communication devices can be determined based at least in part on the results of the analyzing the information relating to the respective device characteristics associated with the respective communication devices. The resource manager component can determine (e.g., determine, measure, or calculate) the other respective device characteristics of the respective communication devices based at least in part on the results of the analyzing the information relating to the respective device characteristics associated with the respective communication devices.

At 816, one or more clusters of one or more subsets of the communication devices can be determined based at least in part on the respective power availability and type of power source, respective signal strengths, respective data performance, respective transit vectors, and/or other respective device characteristics of the respective communication devices, in accordance with the defined grouping criteria. The resource manager component can determine one or more clusters of one or more subsets of the communication devices based at least in part on the respective power availability and type of power source, respective signal strengths, respective data performance, respective transit vectors, and/or other respective device characteristics of the respective communication devices, in accordance with the defined grouping criteria and by employing an associated algorithm(s) (e.g., a predictive algorithm).

At 818, with respect to each cluster of the one or more clusters, a host (e.g., primary) communication device(s) of the cluster of communication devices can be determined, based at least in part on the respective power availability and type of power source, respective signal strengths, respective data performance, respective transit vectors, and/or other respective device characteristics of the respective communication devices, in accordance with the defined grouping criteria, wherein the host communication device(s) can act on behalf of itself and the other communication devices in the cluster of communication devices to communicate information between the other communication devices in the cluster and the communication network (e.g., a network device(s) of the communication network) via the host communication device(s). With respect to each of the one or more clusters of communication devices, the resource manager component can determine or identify a communication device of the cluster (e.g., group) that can be selected as a host communication device(s) that can act on behalf of other communication devices of the cluster of communication devices, based at least in part on the respective power availability and type of power source, respective signal strengths, respective data performance, respective transit vectors, and/or other respective device characteristics of the respective communication devices, in accordance with the defined grouping criteria and the associated algorithm(s), to facilitate communicating data between the other communication devices (and the host communication device itself) and the associated RAN via the host communication device(s).

In some implementations, the resource manager component can employ a round-robin technique with regard to the duties of a host communication device, wherein the resource manager component can select more than one communication device to be a host communication device for the cluster of communication devices during respective times. With regard to the communication devices selected to be host communication devices for the cluster, the resource manager component can generate a round-robin schedule that can alternate (e.g., rotate) the host duties between the selected communication devices at respective times (e.g., a first communication device of the cluster can be the host communication device for the cluster during a first time period, a second communication device of the cluster can be the host communication device for the cluster during a second time period, . . . , a final selected communication device of the cluster can be the host communication device for the cluster during another time period, and the first communication device of the cluster can again be the host communication device for the cluster during a next time period after that other time period).

At 820, with respect to each cluster of communication devices, an instruction can be communicated to the cluster of communication devices to notify the communication devices of the cluster that they are clustered together and to notify them of which communication device(s) of the cluster is the host communication device(s).

At 822, a determination can be made regarding whether any change in the respective device characteristics of the respective communication devices has occurred based at least in part on subsequent information relating to the respective device characteristics associated with the respective communication devices in the region of the communication network. The resource manager component can receive subsequent information relating to the respective device characteristics associated with the respective communication devices from the communication devices and/or another source(s) (e.g., RAN, communication network device) associated with the communication devices and the resource manager component. The resource manager component can perform an analysis (e.g., initial or preliminary analysis) of the subsequent information relating to the respective device characteristics associated with the respective communication devices to facilitate determining whether any change in the respective device characteristics of the respective communication devices has occurred or has been detected by the resource manager component.

If, at reference numeral (e.g., operation) 822, it is determined that a change in the respective device characteristics of the respective communication devices has occurred, at this point, the method 800 can return to reference numeral (e.g., operation) 804, wherein the subsequent information relating to the respective device characteristics associated with the respective communication devices can be analyzed, and the method 800 can continue from that point to facilitate determining clusters of communication devices, determining and making modifications of or to clusters of communications (e.g., to add or remove a communication device(s) to or from a cluster, to change a host communication device(s) of a cluster), dissolving a cluster of communication devices, etc. If, at reference numeral (e.g., operation) 822, it is determined that a change in the respective device characteristics of the respective communication devices has not occurred, at this point, the method 800 can proceed to reference numeral (e.g., operation) 824, wherein the respective cluster(s) of communication devices and respective host communication device(s) can be maintained. At this point, the method 800 can return to reference numeral (e.g., operation) 822, wherein a determination can be made regarding whether any change in the respective device characteristics of the respective communication devices has occurred based at least in part on subsequent information relating to the respective device characteristics associated with the respective communication devices in the region of the communication network. The method 800 can proceed from that point, as more fully disclosed herein.

In some implementations, to facilitate the determining of the one or more clusters of the communication devices and/or the determining of a host communication device for a cluster of communication devices, the resource manager component can respectively weight (e.g., can determine and apply respective weighting values to) the respective items of information relating to the respective device characteristics of the respective communication devices (e.g., information relating to power availability, type of power source, data performance, signal strength, transit vectors, and/or other device characteristics), for example, as more fully disclosed herein.

Figure 9:
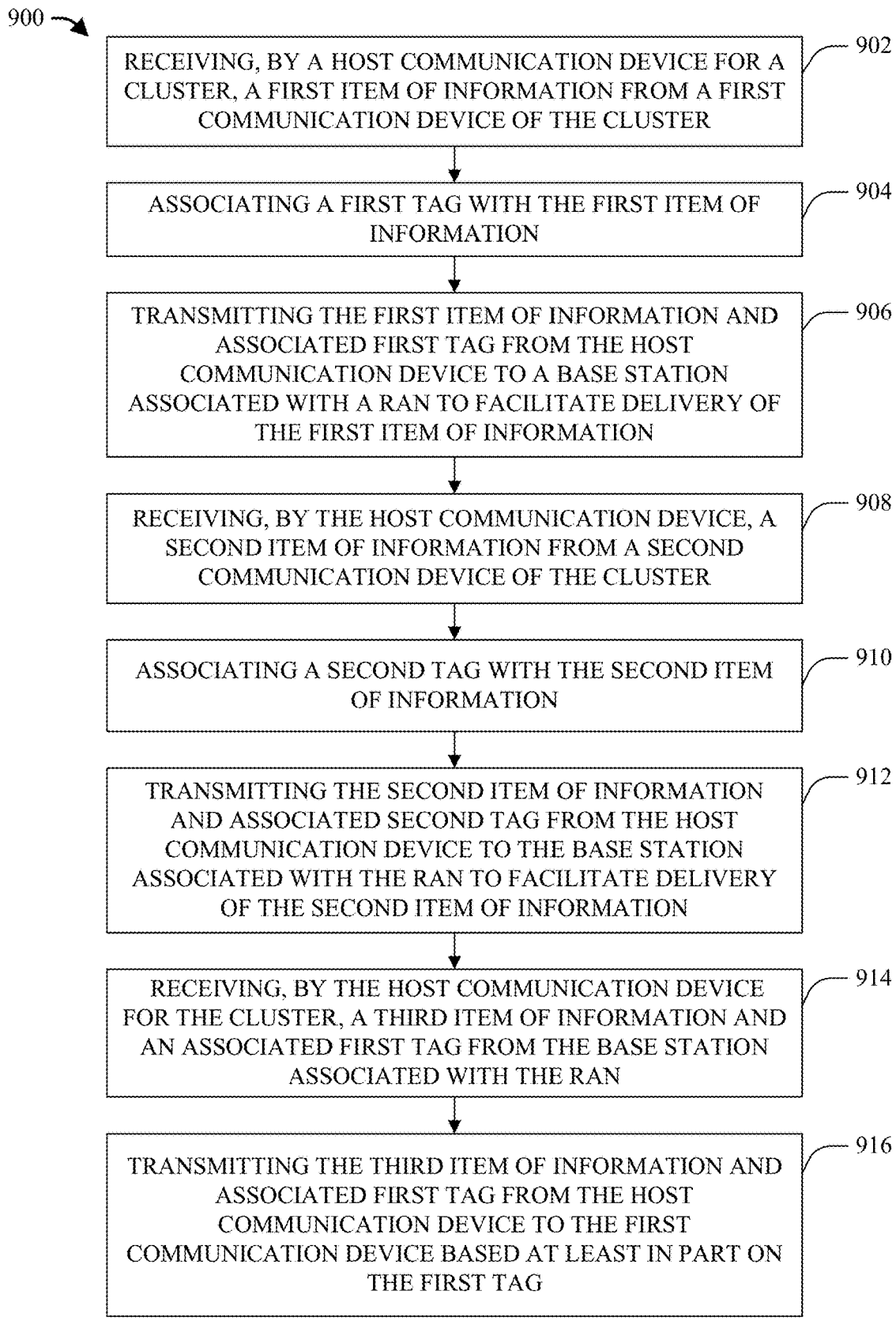
FIG. 9 depicts a flow diagram of an example method that can facilitate communication of information between communication devices in a cluster of communication devices and a RAN in a communication network, in accordance with various aspects and embodiments of the disclosed subject matter.

FIG. 9 depicts a flow chart of another example method 900 that can facilitate communication of information between communication devices in a cluster of communication devices and a RAN in a communication network, in accordance with various aspects and embodiments of the disclosed subject matter. The method 900 can be employed by, for example, communication devices, a RAN, and/or a resource manager component associated with or in a communication network.

At 902, a host communication device for a cluster of communication devices can receive a first item of information from a first communication device of the cluster. The first item of information can be part of a voice call, part of a data session, part of a message (e.g., SMS, MMS), or part of another type of information communication.

At 904, a first tag can be associated with the first item of information, wherein the first tag can be associated with the first communication device, to facilitate identifying the first item of information as being associated with the first communication device. In some implementations, the host communication device can associate (e.g., link, apply) the first tag with the first item of information. In other implementations, the first communication device, as the device sending the information to the host communication device, can associate the first tag with the first item of information (in such case, the operation at reference numeral 904 can occur before the operation at reference numeral 902). In accordance with still other implementations, the resource manager component can associate the first tag with the first item of information. The first tag can comprise identifying information (e.g., mobile device identifier) that can identify the first communication device from which the first item of information was sent.

At 906, the first item of information and associated first tag can be transmitted from the host communication device to a base station associated with a RAN to facilitate delivery of the first item of information and associated first tag to the desired destination (e.g., communication device at the desired destination).

At 908, the host communication device for the cluster can receive a second item of information from a second communication device of the cluster. The second item of information can be part of a voice call, part of a data session, part of a message, or part of another type of information communication.

At 910, a second tag can be associated with the second item of information, wherein the second tag can be associated with the second communication device, to facilitate identifying the second item of information as being associated with the second communication device. In some implementations, the host communication device can associate the second tag with the second item of information. In other implementations, the second communication device, as the device sending the information to the host communication device, can associate the second tag with the second item of information (in such case, the operation at reference numeral 910 can occur before the operation at reference numeral 908). In accordance with still other implementations, the resource manager component can associate the second tag with the second item of information. The second tag can comprise identifying information (e.g., mobile device identifier) that can identify the second communication device from which the second item of information was sent.

At 912, the second item of information and associated second tag can be transmitted from the host communication device to the base station associated with the RAN to facilitate delivery of the second item of information and associated second tag to the desired destination (e.g., communication device at the desired destination).

At 914, the host communication device for the cluster can receive a third item of information and an associated first tag from the base station associated with the RAN. The third item of information can be part of a voice call, part of a data session, part of a message, or part of another type of information communication. The first tag can be associated with the first communication device to facilitate identifying the third item of information as being associated with the first communication device. In some implementations, the sending communication device can associate the first tag with the third item of information. In other implementations, the RAN can associate the first tag with the third item of information. In accordance with still other implementations, the resource manager component can associate the first tag with the third item of information.

At 916, the third item of information and associated first tag can be transmitted from the host communication device to the first communication device based at least in part on the first tag identifying the first communication device as the device to which the third item of information is to be delivered.

Figure 10:
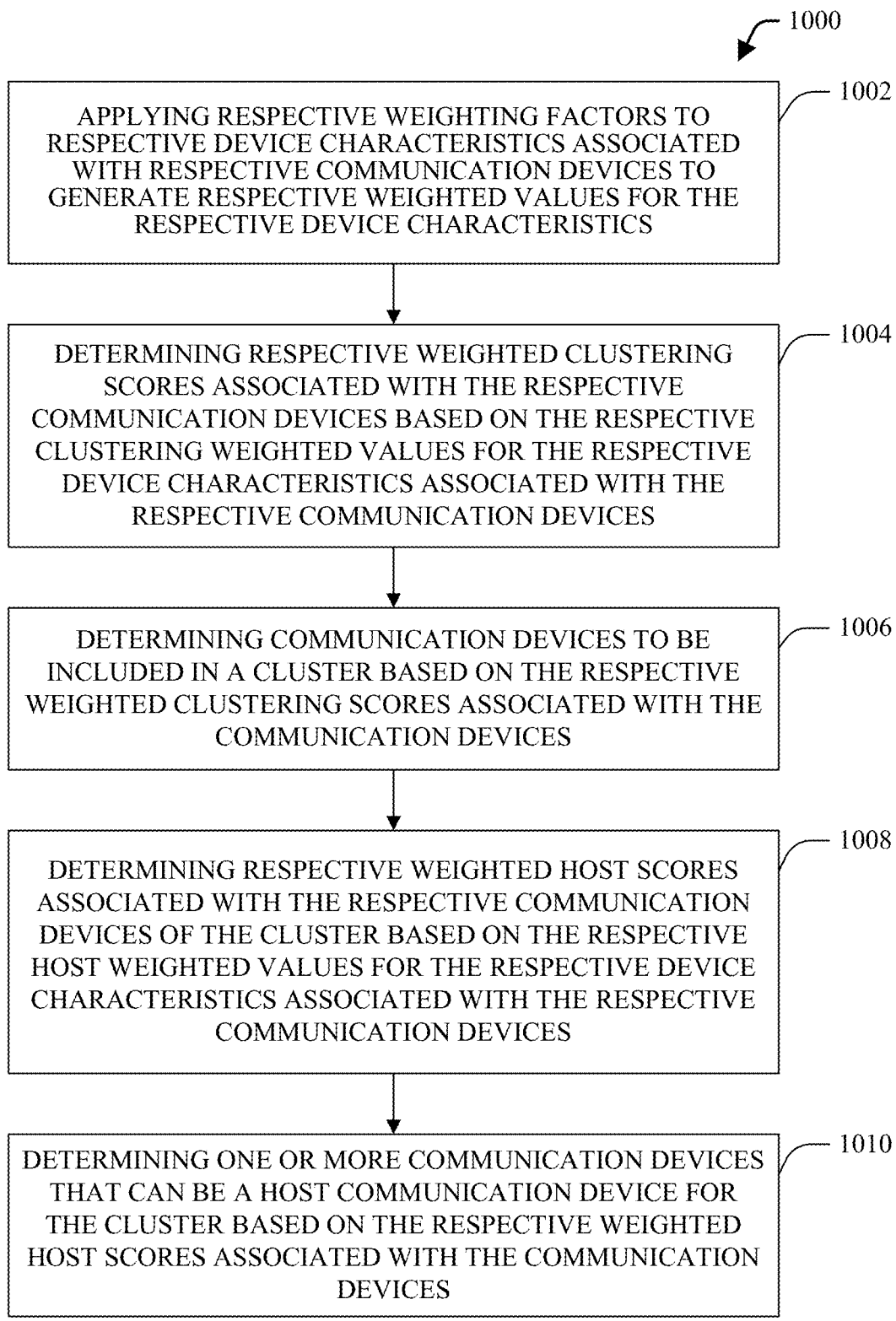
FIG. 10 illustrates a flow chart of an example method that can respectively weight characteristics associated with communication devices of users to facilitate determining a cluster of communication devices and a host communication device that can act on behalf of the communication devices in the cluster, in accordance with various aspects and embodiments of the disclosed subject matter.

Turning to FIG. 10, illustrated is a flow chart of an example method 1000 that can respectively weight characteristics associated with communication devices of users to facilitate determining a cluster of communication devices and a host communication device that can act on behalf of the communication devices in the cluster, in accordance with various aspects and embodiments of the disclosed subject matter. In accordance with various aspects, the method 1000 can be employed by, for example, a resource manager component associated with or in a communication network. In some implementations, all or a portion of the method 1000 can be performed in the cloud.

At 1002, respective weighting factors can be applied to respective device characteristics associated with respective communication devices associated with a region of a communication network to generate respective weighted values for the respective device characteristics associated with the respective communication devices, in accordance with the defined grouping criteria and associated algorithm(s). The resource manager component can determine and apply the respective weighting factors to the respective device characteristics (e.g., respective items of information regarding the respective device characteristics) associated with respective communication devices associated with the region of the communication network, in accordance with the defined grouping criteria and associated algorithm(s). The respective weighting factors applied to the respective device characteristics can be different from each other or can be the same with respective to certain device characteristics.

For example, the resource manager component can apply a first weighting factor to information (e.g., data values or measurements) relating to the respective power availability (and/or respective type of power source) of the respective communication devices, can apply a second weighting factor to information (e.g., data values or measurements) relating to the respective data performance (e.g., available bandwidth, data communication speed) of the respective communication devices, can apply a third weighting factor to information (e.g., data values or measurements) relating to the respective signal strengths of the respective communication devices, and/or can apply a fourth weighting factor to information (e.g., data values or measurements) relating to the respective transit vectors of the respective communication devices, etc.

In some implementations, to facilitate determining which communication devices are to be clustered together into a group, the transit vector information associated with the communication devices can be weighted more heavily than, for instance, signal strength information associated with the communication devices, since the transit vectors associated with the communication devices can be a more significant factor than the signal strengths of the communication devices in determining which communication devices are to be clustered together into a group of communication devices. In certain implementations, to facilitate determining which communication device of a cluster of communication devices is to act as the host communication device, the power availability information can be weighted more heavily than, for instance, the signal strength information associated with the communication devices, as the power availability of the communication devices can be a more significant factor than signal strengths of the communication devices in determining which communication device of the cluster is to be the host communication device.

Thus, for example, at 1002, the resource manager component can apply respective clustering weighting factors to the respective device characteristics associated with the respective communication devices to generate respective clustering weighted values for the respective device characteristics associated with the respective communication devices. The resource manager component also can apply respective host weighting factors to the respective device characteristics associated with the respective communication devices to generate respective host weighted values for the respective device characteristics associated with the respective communication devices.

At 1004, respective weighted clustering scores associated with the respective communication devices can be determined based at least in part on the respective clustering weighted values for the respective device characteristics associated with the respective communication devices. The resource manager component can determine (e.g., calculate) the respective weighted clustering scores associated with the respective communication devices based at least in part on the respective clustering weighted values for the respective device characteristics associated with the respective communication devices. For instance, the resource manager component can combine (e.g., add together) the respective clustering weighted values of the respective device characteristics associated with a first communication device to generate a first weighted clustering score associated with the first communication device, can combine the respective clustering weighted values of the respective device characteristics associated with a second communication device to generate a second weighted clustering score associated with the second communication device, can combine the respective clustering weighted values of the respective device characteristics associated with a third communication device to generate a third weighted clustering score associated with the third communication device, and/or can combine the respective clustering weighted values of the respective device characteristics associated with a fourth communication device to generate a fourth weighted clustering score associated with the fourth communication device, etc.

At 1006, a subset of communication devices that can be included in a cluster of communication devices can be determined based at least in part on the respective weighted clustering scores associated with the communication devices. The resource manager component can determine or identify the subset of communication devices to be included in the cluster of communication devices based at least in part on the respective weighted clustering scores associated with the communication devices. For example, the resource manager component can select a desired number of communication devices having the highest weighted clustering scores, relative to other communication devices having lower weighted clustering scores, to be in the cluster of communication devices, or can select communication devices that have weighted clustering scores that satisfy (e.g., meet or exceed) a minimum threshold weighted clustering score for inclusion in the cluster of communication devices, in accordance with the defined grouping criteria and associated algorithm(s).

At 1008, respective weighted host scores associated with the respective communication devices of the cluster of communication devices can be determined based at least in part on the respective host weighted values for the respective device characteristics associated with the respective communication devices. The resource manager component can determine (e.g., calculate) the respective weighted host scores associated with the respective communication devices of the cluster based at least in part on the respective host weighted values for the respective device characteristics associated with the respective communication devices. For instance, the resource manager component can combine (e.g., add together) the respective host weighted values of the respective device characteristics associated with a first communication device to generate a first weighted host score associated with the first communication device, can combine the respective host weighted values of the respective device characteristics associated with a second communication device to generate a second weighted host score associated with the second communication device, can combine the respective host weighted values of the respective device characteristics associated with a third communication device to generate a third weighted host score associated with the third communication device, and/or can combine the respective host weighted values of the respective device characteristics associated with a fourth communication device to generate a fourth weighted host score associated with the fourth communication device, etc.

At 1010, one or more communication devices that can be a host communication device for the cluster of communication devices can be determined based at least in part on the respective weighted host scores associated with the communication devices. The resource manager component can determine or identify the one or more communication devices in the cluster that can act as the host communication device with respect to the cluster of communication devices based at least in part on the respective weighted host scores associated with the communication devices of the cluster. For instance, the resource manager component can select a communication device of the cluster that has a highest weighted host score, as compared to the weighted host scores of the other communication devices of the cluster, to be a host communication device for the cluster. The host communication device can act on behalf of the other communication devices of the cluster to facilitate communication of information between the other communication devices of the cluster and the associated RAN via the host communication device.

In some implementations, a round-robin technique for hosting a cluster of communication devices can be employed, whereby multiple communication devices of the cluster can be selected to be host communication devices, wherein the selected communication devices alternate and rotate as the host communication device for the cluster at respective times. For instance, the resource manager component can determine or identify a desired number of communication devices of the cluster that have the highest weighted host scores, relative to other communication devices of the cluster that have lower weighted clustering scores, to be host communication devices for the cluster of communication devices at respective times, or can select communication devices of the cluster that have weighted host scores that satisfy (e.g., meet or exceed) a minimum threshold weighted host score for being selected as a host communication device for the cluster of communication devices, in accordance with the defined grouping criteria and associated algorithm(s).

Figure 11:
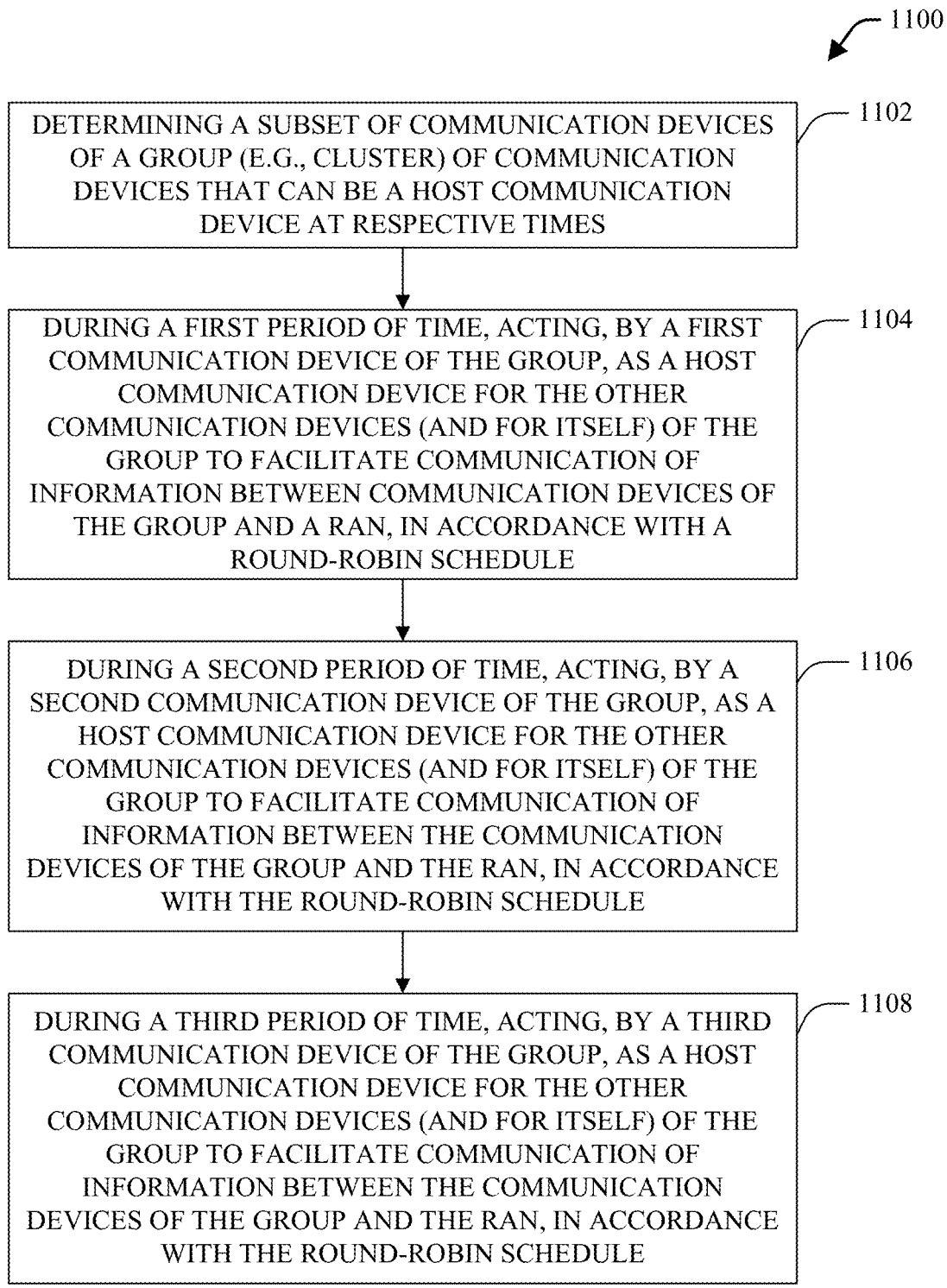
FIG. 11 presents a flow chart of an example method that can employ a round-robin technique to facilitate employing multiple host communication devices that, at respective times, can act on behalf of other communication devices in a cluster of communication devices to facilitate communications between the other communication devices and a RAN of the communication network, in accordance with various aspects and embodiments of the disclosed subject matter.

FIG. 11 presents a flow chart of an example method 1100 that can employ a round-robin technique to facilitate employing multiple host communication devices that, at respective times, can act on behalf of other communication devices in a cluster of communication devices to facilitate communications between the other communication devices and a RAN of the communication network, in accordance with various aspects and embodiments of the disclosed subject matter. In accordance with various aspects, the method 1100 can be employed by, for example, a resource manager component associated with or in a communication network. In some implementations, all or a portion of the method 1100 can be performed in the cloud.

At 1102, a subset of communication devices of a group (e.g., cluster) of communication devices that can be a host communication device at respective times can be determined, in accordance with the defined grouping criteria. The resource manager component can determine communication devices that can be clustered together to form a group of communication devices, as more fully disclosed herein. The resource manager component can determine, identify, and/or or select a subset of communication devices that can act as a host communication device for the group of communication devices at respective times, in an alternating, round-robin manner (e.g., on a rotating schedule), in accordance with the defined grouping criteria and related algorithm(s).

At 1104, during a first period of time, a first communication device of the group of communication devices can act as a host communication device for the other communication devices (and for itself) of the group of communication devices to facilitate communication of information between communication devices of the group and a RAN, in accordance with a round-robin schedule. The resource manager component (or another component) can set up or arrange a round-robin schedule to rotate communication devices in the subset of communication devices as a host communication device at respective periods of time. As part of the round-robin schedule, the resource manager component (or another component or device) can have (e.g., can instruct) the first communication device of the group to act as the host communication device for the other communication devices (and for itself) of the group, during the first period of time, to facilitate communication of information between the communication devices of the group and the RAN.

At 1106, during a second period of time, a second communication device of the group of communication devices can act as a host communication device for the other communication devices (and for itself) of the group of communication devices to facilitate communication of information between the communication devices of the group and the RAN, in accordance with the round-robin schedule. In connection with the round-robin schedule, the resource manager component (or another component or device) can have (e.g., can instruct) the second communication device of the group to act as the host communication device for the other communication devices (and for itself) of the group, during the second period of time, to facilitate communication of information between the communication devices of the group and the RAN.

At 1108, during a third period of time, a third communication device of the group of communication devices can act as a host communication device for the other communication devices (and for itself) of the group of communication devices to facilitate communication of information between the communication devices of the group and the RAN, in accordance with the round-robin schedule. In connection with the round-robin schedule, the resource manager component (or another component or device) can have (e.g., can instruct) the third communication device of the group to act as the host communication device for the other communication devices (and for itself) of the group, during the third period of time, to facilitate communication of information between the communication devices of the group and the RAN.

At this point, the method 1100 can proceed from reference numeral 1108 to reference numeral 1104, wherein the method 1100 can proceed to have the first communication device of the group act as a host communication device for the other communication devices (and for itself) of the group, during a next (e.g., fourth) period of time, to have (e.g., at reference numeral 1106) the second communication device of the group act as a host communication device for the other communication devices (and for itself) of the group, during a following (e.g., fifth) period of time, and to have (e.g., at reference numeral 1108) the third communication device of the group act as a host communication device for the other communication devices (and for itself) of the group, during a subsequent (e.g., sixth) period of time, etc. This round-robin schedule can continue, for example, until the resource manager component determines that one of the communication devices of the subset of communication devices selected to be a host communication device is to be removed from the subset and/or replaced, and/or until the resource manager component determines that the round-robin schedule is to be modified or terminated.

It is to be appreciated and understood that, while the method 1100 describes a round-robin technique that employs three communication devices to act as a host communication device for the group of communication devices, the disclosed subject matter is not so limited, as, in accordance with various implementations, there also can be less than three communication devices or more than three communication devices that can be determined and selected to act a host communication device for the group of communication devices, in accordance with the defined grouping criteria.

Figure 12:
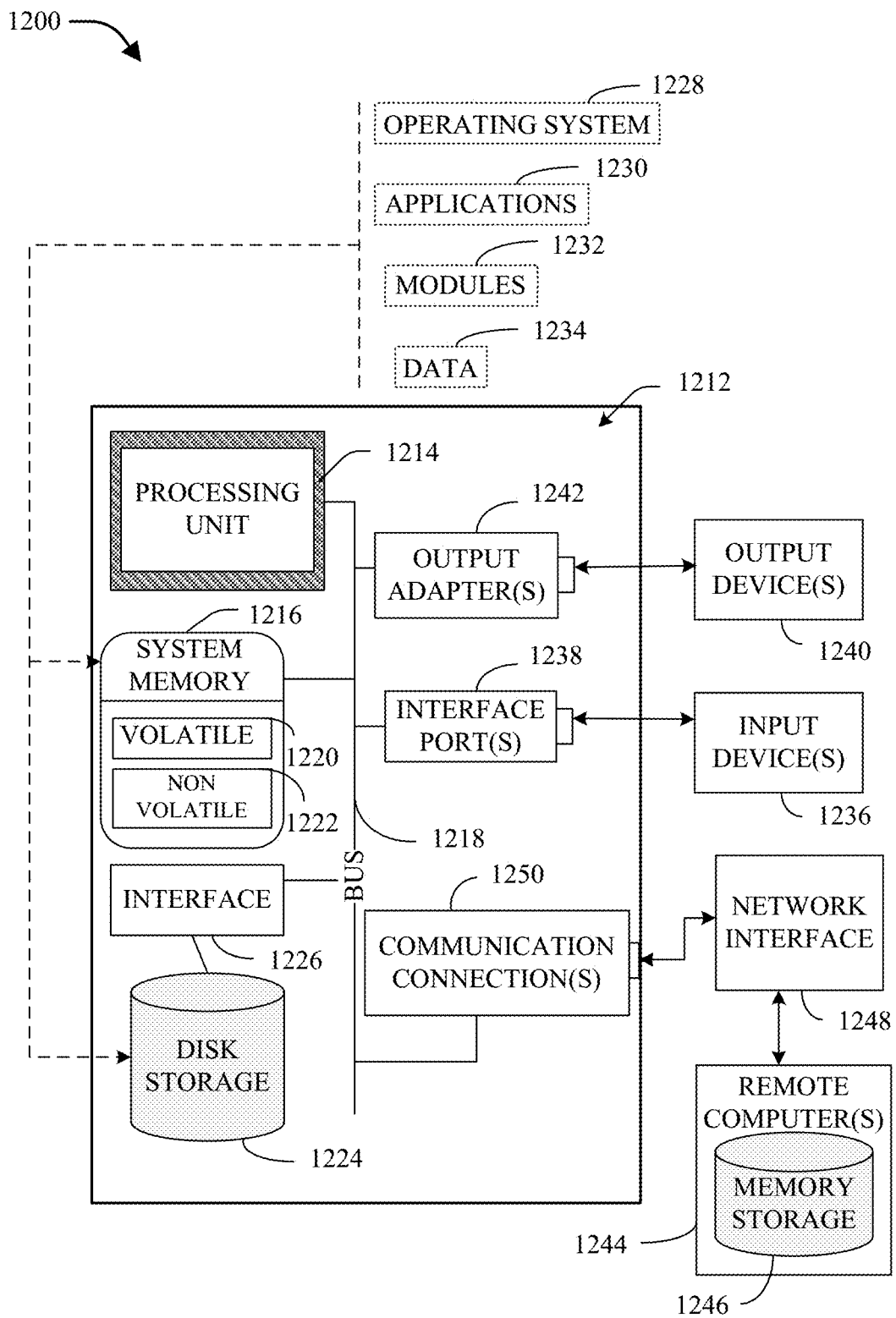
FIG. 12 is a schematic block diagram illustrating a suitable operating environment.
Figure 13:
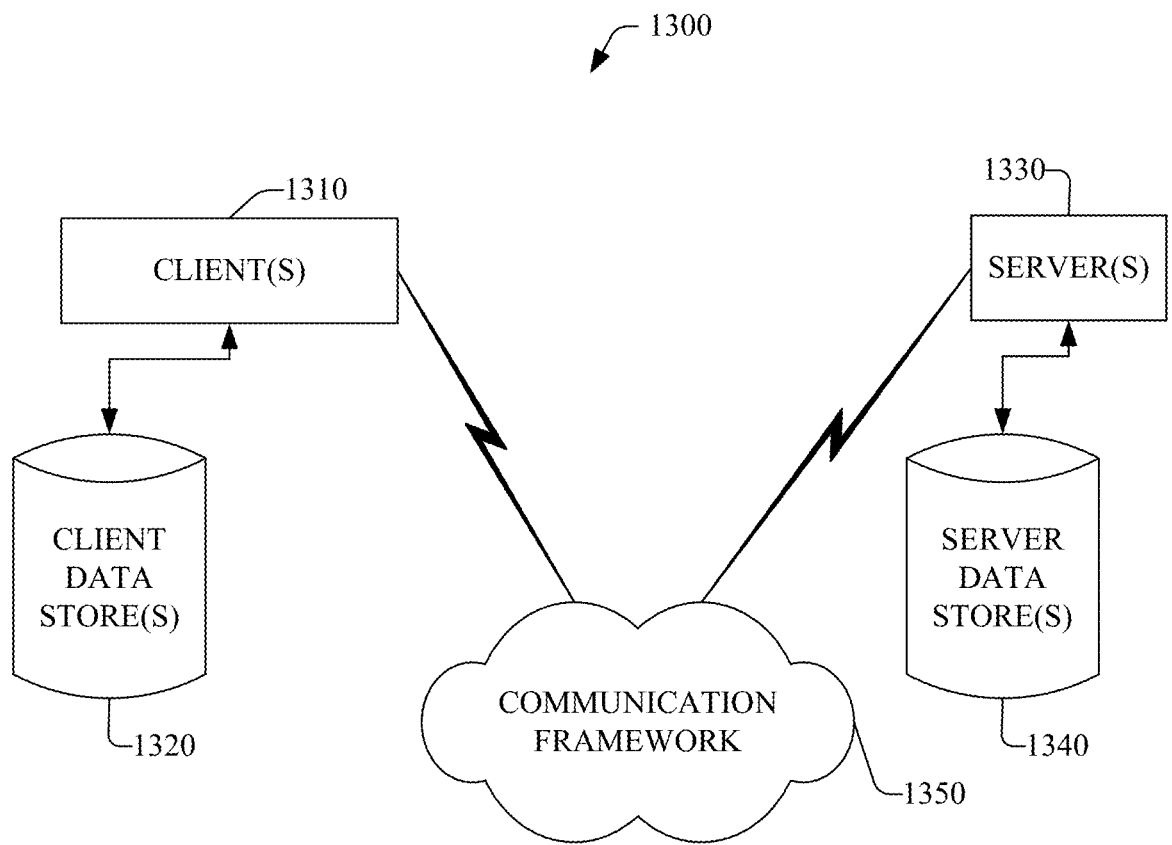
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, electronic tablets or pads, etc.), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 12, a suitable environment 1200 for implementing various aspects of this disclosure includes a computer 1212. The computer 1212 includes a processing unit 1214, a system memory 1216, and a system bus 1218. It is to be appreciated that the computer 1212 can be used in connection with implementing one or more of the systems, components, or methods shown and described in connection with FIGS. 1-11, or otherwise described herein. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 also includes removable/non-removable, volatile/non-volatile computer storage media. FIG. 12 illustrates, for example, a disk storage 1224. Disk storage 1224 includes, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used, such as interface 1226.

FIG. 12 also depicts software that acts as an intermediary between users and the basic computer resources described in the suitable operating environment 1200. Such software includes, for example, an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored, e.g., in system memory 1216 or on disk storage 1224. It is to be appreciated that this disclosure can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample-computing environment 1300 (e.g., computing system) with which the subject matter of this disclosure can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing this disclosure, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1320 that can be employed to store information local to the client(s) 1310. Similarly, the server(s) 1330 are operatively connected to one or more server data store(s) 1340 that can be employed to store information local to the servers 1330.

It is to be noted that aspects, features, and/or advantages of the disclosed subject matter can be exploited in substantially any wireless telecommunication or radio technology, e.g., wi-fi; bluetooth; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, resource manager component, base station, RAN, communication network, processor component, data store, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
analyzing, by a system comprising a processor, respective device characteristics associated with respective devices in a region in a communication network environment, wherein the respective device characteristics comprise respective future device characteristics associated with the respective devices, wherein the respective future device characteristics associated with the respective devices are determined based on a prediction that the respective future device characteristics will occur at a subsequent time later than a present time, wherein the respective device characteristics comprise respective transit vectors and respective power source availabilities associated with the respective devices, wherein the respective future device characteristics comprise respective future transit vectors and respective future power source availabilities associated with the respective devices, and wherein the respective power source availabilities relate to respective amounts of power that are available to be provided to the respective devices by respective power sources associated with the respective devices;

determining, by the system, a portion of the respective devices to be grouped to form a group of devices based on a first result of the analyzing, wherein the first result indicates which devices of the respective devices are to be grouped to form the group of devices; and determining, by the system, a first device of the group of devices to be a host device that communicates with a network device on behalf of second devices of the group of devices based on a second result of the analyzing.

2. The method of claim 1, further comprising:

receiving, by the system, from the respective devices, respective data relating to the respective power source availabilities associated with the respective devices, respective signal strengths associated with the respective devices, respective data performances associated with the respective devices, and the respective transit vectors associated with the respective devices.

3. The method of claim 1, further comprising:

determining, by the system, the respective power source availabilities, respective signal strengths, respective data performances, and the respective transit vectors, associated with the respective devices based on analyzing the respective data, wherein the respective data performances comprise respective available bandwidths and respective data communication speeds associated with the respective devices, wherein the determining of the portion of the respective devices to be grouped to form the group of devices comprises determining the portion of the respective devices to be grouped to form the group of devices based on the respective power source availabilities, the respective signal strengths, the respective data performances, and the respective transit vectors, associated with the respective devices; and clustering, by the system, the portion of the respective devices to form the group of devices in response to the determining the portion of the respective devices to be grouped to form the group of devices.

4. The method of claim 1, further comprising:

predicting, by the system, the respective future device characteristics associated with the respective devices.

5. The method of claim 1, further comprising:

detecting, by the system, a change in the respective device characteristics associated with the respective devices;

modifying, by the system, the group of devices to form a different group of devices comprising a different device in response to the change in the respective device characteristics associated with the respective devices; and determining, by the system, a next host device of the different group of devices in response to the modifying of the group of devices to form the different group of devices.

6. The method of claim 1, wherein the second devices of the group of devices comprise a third device and a fourth device, and wherein the method further comprises:

associating, by the system, a first tag to a first item of information being communicated by the third device, wherein the first tag facilitates identifying the third device as being associated with the first item of information;

associating, by the system, a second tag to a second item of information being communicated by the fourth device, wherein the second tag facilitates identifying the fourth device as being associated with the second item of information;

communicating, by the system, the first item of information and the first tag to a radio access network via the host device; and communicating, by the system, the second item of information and the second tag to the radio access network via the host device.

7. The method of claim 1, wherein the analyzing comprises analyzing first data relating to the respective power source availabilities associated with the respective devices, second data relating to respective signal strengths associated with the respective devices, third data relating to respective data performances associated with the respective devices, and fourth data relating to the respective transit vectors associated with the respective devices, and wherein the determining of the first device of the group of devices to be the host device comprises determining, based on the second result of the analyzing the first data, the second data, the third data, and the fourth data, the first device to be the host device that communicates with the network device on behalf of the second devices to facilitate communication of information between the network device and the second devices via the first device.

8. The method of claim 7, further comprising:

applying, by the system, respective weight factors to the first data, the second data, the third data, and the fourth data to generate first weighted data, second weighted data, third weighted data, and fourth weighted data, wherein the determining of the first device to be the host device that communicates with the network device on behalf of the second devices to facilitate the communication of the information between the network device and the second devices via the first device comprises determining, based on the second result of the analyzing the first weighted data, the second weighted data, the third weighted data, and the fourth weighted data, the first device to be the host device that communicates with the network device on behalf of the second devices to facilitate the communication of the information between the network device and the second devices via the first device.

9. The method of claim 1, further comprising:

scheduling, by the system, communication of respective data packets between the network device and the second devices via the host device based on the first result and the second result of the analyzing.

10. The method of claim 1, further comprising:

determining, by the system, a round-robin host device arrangement to rotate host device operations of respective host devices, comprising the host device, in a group of devices, comprising the portion of the respec-

49 tive devices, between the respective host devices during respective time periods.

11. A system, comprising:

a processor; and a memory that stores executable instructions that, when executed by the processor, facilitate performance of operations, comprising:

analyzing respective device characteristics of respective devices in an area in a communication network environment, wherein the respective device characteristics comprise respective future device characteristics associated with the respective devices, wherein the respective future device characteristics associated with the respective devices are predicted to occur at a future time, wherein the respective device characteristics comprise respective transit vectors and respective power source availabilities associated with the respective devices, wherein the respective future device characteristics comprise respective future transit vectors and respective future power source availabilities associated with the respective devices, and wherein the respective power source availabilities relate to respective electrical powers that are available to be provided to the respective devices by respective power sources associated with the respective devices;

determining a cluster of devices, comprising a portion of the respective devices, based on a first result of the analyzing, wherein the first result specifies which devices of the respective devices are to be grouped to form the group of devices; and determining a first device of the cluster of devices to be a host device that communicates with a network device, on behalf of second devices of the cluster of devices other than the first device, based on a second result of the analyzing, to facilitate communications between the network device and the second devices.

12. The system of claim 11, wherein the analyzing comprises analyzing first data relating to the respective power source availabilities of the respective devices, second data relating to respective signal strengths associated with the respective devices, third data relating to respective data performances of the respective devices, and fourth data relating to the respective transit vectors associated with the respective devices, and wherein the determining of the first device of the cluster of devices to be the host device comprises determining the first device to be the host device that communicates with the network device on behalf of the second devices of the cluster of devices to facilitate communication of information between the network device and the second devices via the host device based on the second result of the analyzing the first data, the second data, the third data, and the fourth data.

13. The system of claim 12, wherein the operations further comprise:

applying respective weight factors to the first data, the second data, the third data, and the fourth data to generate first weighted data, second weighted data, third weighted data, and fourth weighted data, and wherein the determining of the first device to be the host device that communicates with the network device on behalf of the second devices of the cluster of devices to facilitate the communication of the information between the network device and the second devices via the host device comprises determining, based on the second result of the analyzing the first weighted data,

50 the second weighted data, the third weighted data, and the fourth weighted data, the first device to be the host device that communicates with the network device on behalf of the second devices of the cluster of devices to facilitate the communication of the information between the network device and the second devices via the host device.

14. The system of claim 12, wherein the operations further comprise:

applying respective weight factors to the first data, the second data, the third data, and the fourth data to generate first weighted data, second weighted data, third weighted data, and fourth weighted data, and wherein the determining of the cluster of devices comprising the portion of the respective devices based on the first result of the analyzing comprises determining, based on the first result of the analyzing the first weighted data, the second weighted data, the third weighted data, and the fourth weighted data, the cluster of devices comprising the portion of the respective devices.

15. The system of claim 11, wherein the operations further comprise:

to facilitate creating the cluster of devices, connecting the host device to the second devices based on a communication protocol of respective communication protocols respectively available to the first device and the second devices.

16. The system of claim 11, wherein the operations further comprise:

tagging respective items of information with respective tags associated with the second devices to facilitate identification of the respective items of information as being respectively associated with the second devices.

17. The system of claim 11, wherein the analyzing of the respective device characteristics of the respective devices in the area, the determining of the cluster of devices, and the determining of the first device of the cluster of devices to be the host device are performed by a component of the system associated with the network device that is associated with the communication network environment.

18. The system of claim 11, wherein the operations further comprise:

determining a scheduling of communication of respective packets of data between the network device and the second devices via the host device based on the first result and the second result of the analyzing.

19. A machine-readable storage medium, comprising executable instructions that, when executed by a processor, facilitate performance of operations, comprising:

analyzing respective device attributes of respective devices in a region in a communication network environment, wherein the respective device attributes comprise respective future device attributes associated with the respective devices, wherein the respective future device attributes associated with the respective devices are predicted to occur at a future time, wherein the respective device attributes comprise respective transit vectors and respective power availabilities associated with the respective devices, wherein the respective future device attributes comprise respective future transit vectors and respective future power availabilities associated with the respective devices, and wherein the respective power availabilities relate to respective electrical powers that are available to be provided to the respective devices to power the respective devices;

determining a cluster of devices, comprising a portion of the respective devices, based on a first result of the analyzing, wherein the first result indicates which devices of the respective devices are to be grouped to form the group of devices; and determining a first device of the cluster of devices to be a host device that communicates with a network device on behalf of second devices of the cluster of devices other than the first device based on a second result of the analyzing.

20. The machine-readable storage medium of claim 19, wherein the respective device attributes comprise respective resource availability attributes and respective device performance attributes associated with the respective devices, and wherein the respective resource availability attributes comprise the respective power availabilities.

\* \* \* \* \*